(12) United States Patent
Arora et al.

(10) Patent No.: US 8,356,935 B2
(45) Date of Patent: Jan. 22, 2013

(54) METHODS FOR ASSESSING A TEMPERATURE IN A SUBSURFACE FORMATION

(75) Inventors: Dhruv Arora, Houston, TX (US); Ronald Marshall Bass, Houston, TX (US); Graham Patrick Bradford, Fond du Lac, WI (US); David Booth Burns, Houston, TX (US); Eric Abreu Gesualdi, League City, TX (US); Scott Vinh Nguyen, Houston, TX (US); Edward Everett de St. Remey, Katy, TX (US); Stephen Taylor Thompson, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 12/901,257

(22) Filed: Oct. 8, 2010

(65) Prior Publication Data
US 2011/0134958 A1 Jun. 9, 2011

Related U.S. Application Data

(60) Provisional application No. 61/250,347, filed on Oct. 9, 2009, provisional application No. 61/250,353, filed on Oct. 9, 2009, provisional application No. 61/250,218, filed on Oct. 9, 2009, provisional application No. 61/322,513, filed on Apr. 9, 2010.

(51) Int. Cl.
*G01K 13/00* (2006.01)
(52) U.S. Cl. ........................................ 374/136
(58) Field of Classification Search ................ 374/136
See application file for complete search history.

(56) References Cited

U.S. PATENT DOCUMENTS

| 1,811,560 | A | 6/1931 | Ranney |
| 2,011,710 | A | 8/1935 | Davis |
| 2,244,255 | A | 6/1941 | Looman |
| 2,757,739 | A | 8/1956 | Douglas et al. |
| 2,761,663 | A | 9/1956 | Gerdetz |
| 2,794,504 | A | 6/1957 | Carpenter |
| 2,942,223 | A | 6/1960 | Lennox et al. |
| 3,026,940 | A | 3/1962 | Spitz |
| 3,114,417 | A | 12/1963 | McCarthy |
| 3,131,763 | A | 5/1964 | Kunetka et al. |
| 3,149,672 | A | 9/1964 | Orkiszewski et al. |
| 3,207,220 | A | 9/1965 | Williams |
| 3,316,344 | A | 4/1967 | Kidd et al. |
| 3,342,267 | A | 9/1967 | Cotter et al. |
| 3,410,977 | A | 11/1968 | Ando |
| 3,477,058 | A | 11/1969 | Vedder et al. |
| 3,492,463 | A | 1/1970 | Wringer et al. |

(Continued)

FOREIGN PATENT DOCUMENTS

| CA | 899987 | 5/1972 |
| CA | 1253555 | 5/1989 |

(Continued)

OTHER PUBLICATIONS

Australian Patent and Trademark Office, Examiner's First Report for Australian Patent Application No. 2007309735, mailed Dec. 9, 2010.

(Continued)

*Primary Examiner* — Lisa Caputo
*Assistant Examiner* — Jamel Williams

(57) ABSTRACT

Methods for assessing a temperature in an opening in a subsurface formation are described herein. A method may include assessing one or more dielectric properties along a length of an insulated conductor located in the opening and assessing one or more temperatures along the length of the insulated conductor based on the one or more assessed dielectric properties.

34 Claims, 9 Drawing Sheets

U.S. PATENT DOCUMENTS

| | | |
|---|---|---|
| 3,515,837 A | 6/1970 | Ando |
| 3,547,192 A | 12/1970 | Claridge et al. |
| 3,562,401 A | 2/1971 | Long |
| 3,580,987 A | 5/1971 | Priaroggia |
| 3,614,387 A | 10/1971 | Wrob et al. |
| 3,629,551 A | 12/1971 | Ando |
| 3,672,196 A | 6/1972 | Levacher et al. |
| 3,679,812 A | 7/1972 | Owens |
| 3,757,860 A | 9/1973 | Pritchett |
| 3,761,599 A | 9/1973 | Beatty |
| 3,896,260 A | 7/1975 | Plummer |
| 4,256,945 A | 3/1981 | Carter et al. |
| 4,280,046 A | 7/1981 | Shimotori et al. |
| 4,344,483 A | 8/1982 | Fisher et al. |
| 4,368,452 A | 1/1983 | Kerr, Jr. |
| 4,370,518 A | 1/1983 | Guzy |
| 4,470,459 A | 9/1984 | Copland et al. |
| 4,520,229 A | 5/1985 | Luzzi et al. |
| 4,524,827 A | 6/1985 | Bridges et al. |
| 4,538,682 A | 9/1985 | McManus et al. |
| 4,549,073 A | 10/1985 | Tamura et al. |
| 4,570,715 A | 2/1986 | Van Meurs et al. |
| 4,572,299 A | 2/1986 | Van Egmond et al. |
| 4,585,066 A | 4/1986 | Moore et al. |
| 4,623,401 A | 11/1986 | Derbyshire et al. |
| 4,626,665 A | 12/1986 | Fort, III |
| 4,639,712 A | 1/1987 | Kobayashi et al. |
| 4,645,906 A | 2/1987 | Yagnik et al. |
| 4,662,437 A | 5/1987 | Renfro et al. |
| 4,694,907 A | 9/1987 | Stahl et al. |
| 4,695,713 A | 9/1987 | Krumme |
| 4,698,583 A | 10/1987 | Sandberg |
| 4,701,587 A | 10/1987 | Carter et al. |
| 4,704,514 A | 11/1987 | Van Egmond et al. |
| 4,716,960 A | 1/1988 | Eastlund et al. |
| 4,717,814 A | 1/1988 | Krumme |
| 4,733,057 A | 3/1988 | Stanzel et al. |
| 4,752,673 A | 6/1988 | Krumme |
| 4,785,163 A | 11/1988 | Sandberg |
| 4,794,226 A | 12/1988 | Derbyshire |
| 4,814,587 A | 3/1989 | Carter |
| 4,821,798 A | 4/1989 | Bridges et al. |
| 4,849,611 A | 7/1989 | Whitney et al. |
| 4,886,118 A | 12/1989 | Van Meurs et al. |
| 4,985,313 A | 1/1991 | Penneck et al. |
| 5,040,601 A | 8/1991 | Karlsson et al. |
| 5,060,287 A | 10/1991 | Van Egmond |
| 5,065,501 A | 11/1991 | Henschen et al. |
| 5,065,818 A | 11/1991 | Van Egmond |
| 5,066,852 A | 11/1991 | Willbanks |
| 5,070,533 A | 12/1991 | Bridges et al. |
| 5,073,625 A | 12/1991 | Derbyshire |
| 5,152,341 A | 10/1992 | Kasevich |
| 5,182,427 A | 1/1993 | McGaffigan |
| 5,189,283 A | 2/1993 | Carl, Jr. et al. |
| 5,207,273 A | 5/1993 | Cates et al. |
| 5,209,987 A | 5/1993 | Penneck et al. |
| 5,226,961 A | 7/1993 | Nahm et al. |
| 5,289,882 A | 3/1994 | Moore |
| 5,316,492 A | 5/1994 | Schaareman |
| 5,483,414 A | 1/1996 | Turtiainen |
| 5,512,732 A | 4/1996 | Yagnik et al. |
| 5,553,478 A | 9/1996 | Di Troia |
| 5,569,845 A | 10/1996 | Butcher et al. |
| 5,579,575 A | 12/1996 | Lamome et al. |
| 5,619,611 A | 4/1997 | Loschen et al. |
| 5,621,844 A | 4/1997 | Bridges |
| 5,667,009 A | 9/1997 | Moore |
| 5,713,415 A | 2/1998 | Bridges |
| 5,782,301 A | 7/1998 | Neuroth et al. |
| 5,788,376 A | 8/1998 | Sultan et al. |
| 5,801,332 A | 9/1998 | Berger et al. |
| 5,854,472 A | 12/1998 | Wildi |
| 5,911,898 A | 6/1999 | Jacobs et al. |
| 6,015,015 A | 1/2000 | Luft et al. |
| 6,023,554 A | 2/2000 | Vinegar et al. |
| 6,056,057 A | 5/2000 | Vinegar et al. |
| 6,079,499 A | 6/2000 | Mikus et al. |
| 6,102,122 A | 8/2000 | de Rouffignac |
| 6,288,372 B1 | 9/2001 | Sandberg et al. |
| 6,313,431 B1 | 11/2001 | Schneider et al. |
| 6,318,469 B1 | 11/2001 | Patel |
| 6,581,684 B2 | 6/2003 | Wellington et al. |
| 6,585,046 B2 | 7/2003 | Neuroth et al. |
| 6,588,503 B2 | 7/2003 | Karanikas et al. |
| 6,588,504 B2 | 7/2003 | Wellington et al. |
| 6,591,906 B2 | 7/2003 | Wellington et al. |
| 6,591,907 B2 | 7/2003 | Zhang et al. |
| 6,607,033 B2 | 8/2003 | Wellington et al. |
| 6,609,570 B2 | 8/2003 | Wellington et al. |
| 6,688,387 B1 | 2/2004 | Wellington et al. |
| 6,698,515 B2 | 3/2004 | Karanikas et al. |
| 6,702,016 B2 | 3/2004 | de Rouffignac et al. |
| 6,712,135 B2 | 3/2004 | Wellington et al. |
| 6,712,136 B2 | 3/2004 | de Rouffignac et al. |
| 6,712,137 B2 | 3/2004 | Vinegar et al. |
| 6,715,546 B2 | 4/2004 | Vinegar et al. |
| 6,715,547 B2 | 4/2004 | Vinegar et al. |
| 6,715,548 B2 | 4/2004 | Wellington et al. |
| 6,715,549 B2 | 4/2004 | Wellington et al. |
| 6,719,047 B2 | 4/2004 | Fowler et al. |
| 6,722,429 B2 | 4/2004 | de Rouffignac et al. |
| 6,722,430 B2 | 4/2004 | Vinegar et al. |
| 6,722,431 B2 | 4/2004 | Karanikas et al. |
| 6,725,920 B2 | 4/2004 | Zhang et al. |
| 6,725,928 B2 | 4/2004 | Vinegar et al. |
| 6,729,395 B2 | 5/2004 | Shahin, Jr. et al. |
| 6,729,396 B2 | 5/2004 | Vinegar et al. |
| 6,729,397 B2 | 5/2004 | Zhang et al. |
| 6,729,401 B2 | 5/2004 | Vinegar et al. |
| 6,732,794 B2 | 5/2004 | Wellington et al. |
| 6,732,795 B2 | 5/2004 | de Rouffignac et al. |
| 6,732,796 B2 | 5/2004 | Vinegar et al. |
| 6,736,215 B2 | 5/2004 | Maher et al. |
| 6,739,393 B2 | 5/2004 | Vinegar et al. |
| 6,739,394 B2 | 5/2004 | Vinegar et al. |
| 6,742,587 B2 | 6/2004 | Vinegar et al. |
| 6,742,588 B2 | 6/2004 | Wellington et al. |
| 6,742,589 B2 | 6/2004 | Berchenko et al. |
| 6,742,593 B2 | 6/2004 | Vinegar et al. |
| 6,745,831 B2 | 6/2004 | de Rouffignac et al. |
| 6,745,832 B2 | 6/2004 | Wellington et al. |
| 6,745,837 B2 | 6/2004 | Wellington et al. |
| 6,749,021 B2 | 6/2004 | Vinegar et al. |
| 6,752,210 B2 | 6/2004 | de Rouffignac et al. |
| 6,758,268 B2 | 7/2004 | Vinegar et al. |
| 6,761,216 B2 | 7/2004 | Vinegar et al. |
| 6,769,483 B2 | 8/2004 | de Rouffignac et al. |
| 6,769,485 B2 | 8/2004 | Vinegar et al. |
| 6,782,947 B2 | 8/2004 | de Rouffignac et al. |
| 6,789,625 B2 | 9/2004 | de Rouffignac et al. |
| 6,805,195 B2 | 10/2004 | Vinegar et al. |
| 6,820,688 B2 | 11/2004 | Vinegar et al. |
| 6,866,097 B2 | 3/2005 | Vinegar et al. |
| 6,871,707 B2 | 3/2005 | Karanikas et al. |
| 6,877,554 B2 | 4/2005 | Stegemeier et al. |
| 6,877,555 B2 | 4/2005 | Karanikas et al. |
| 6,880,633 B2 | 4/2005 | Wellington et al. |
| 6,880,635 B2 | 4/2005 | Vinegar et al. |
| 6,889,769 B2 | 5/2005 | Wellington et al. |
| 6,896,053 B2 | 5/2005 | Berchenko et al. |
| 6,902,003 B2 | 6/2005 | Maher et al. |
| 6,902,004 B2 | 6/2005 | de Rouffignac et al. |
| 6,910,536 B2 | 6/2005 | Wellington et al. |
| 6,913,078 B2 | 7/2005 | Shahin, Jr. et al. |
| 6,915,850 B2 | 7/2005 | Vinegar et al. |
| 6,918,442 B2 | 7/2005 | Wellington et al. |
| 6,918,443 B2 | 7/2005 | Wellington et al. |
| 6,923,257 B2 | 8/2005 | Wellington et al. |
| 6,923,258 B2 | 8/2005 | Wellington et al. |
| 6,929,067 B2 | 8/2005 | Vinegar et al. |
| 6,932,155 B2 | 8/2005 | Vinegar et al. |
| 6,942,032 B2 | 9/2005 | La Rovere et al. |
| 6,948,562 B2 | 9/2005 | Wellington et al. |
| 6,948,563 B2 | 9/2005 | Wellington et al. |
| 6,951,247 B2 | 10/2005 | de Rouffignac et al. |
| 6,953,087 B2 | 10/2005 | de Rouffignac et al. |

| Patent | Kind | Date | Inventor |
|---|---|---|---|
| 6,958,704 | B2 | 10/2005 | Vinegar et al. |
| 6,959,761 | B2 | 11/2005 | Berchenko et al. |
| 6,964,300 | B2 | 11/2005 | Vinegar et al. |
| 6,966,372 | B2 | 11/2005 | Wellington et al. |
| 6,966,374 | B2 | 11/2005 | Vinegar et al. |
| 6,969,123 | B2 | 11/2005 | Vinegar et al. |
| 6,973,967 | B2 | 12/2005 | Stegemeier et al. |
| 6,981,548 | B2 | 1/2006 | Wellington et al. |
| 6,991,032 | B2 | 1/2006 | Berchenko et al. |
| 6,991,033 | B2 | 1/2006 | Wellington et al. |
| 6,991,036 | B2 | 1/2006 | Sumnu-Dindoruk et al. |
| 6,991,045 | B2 | 1/2006 | Vinegar et al. |
| 6,994,160 | B2 | 2/2006 | Wellington et al. |
| 6,994,168 | B2 | 2/2006 | Wellington et al. |
| 6,994,169 | B2 | 2/2006 | Zhang et al. |
| 6,997,255 | B2 | 2/2006 | Wellington et al. |
| 6,997,518 | B2 | 2/2006 | Vinegar et al. |
| 7,004,247 | B2 | 2/2006 | Cole et al. |
| 7,004,251 | B2 | 2/2006 | Ward et al. |
| 7,011,154 | B2 | 3/2006 | Maher et al. |
| 7,036,583 | B2 | 5/2006 | de Rouffignac et al. |
| 7,040,397 | B2 | 5/2006 | de Rouffignac et al. |
| 7,040,398 | B2 | 5/2006 | Wellington et al. |
| 7,040,399 | B2 | 5/2006 | Wellington et al. |
| 7,040,400 | B2 | 5/2006 | de Rouffignac et al. |
| 7,051,807 | B2 | 5/2006 | Vinegar et al. |
| 7,051,808 | B1 | 5/2006 | Vinegar et al. |
| 7,055,600 | B2 | 6/2006 | Messier et al. |
| 7,063,145 | B2 | 6/2006 | Veenstra et al. |
| 7,066,254 | B2 | 6/2006 | Vinegar et al. |
| 7,066,257 | B2 | 6/2006 | Wellington et al. |
| 7,073,578 | B2 | 7/2006 | Vinegar et al. |
| 7,077,198 | B2 | 7/2006 | Vinegar et al. |
| 7,077,199 | B2 | 7/2006 | Vinegar et al. |
| 7,086,465 | B2 | 8/2006 | Wellington et al. |
| 7,086,468 | B2 | 8/2006 | de Rouffignac et al. |
| 7,090,013 | B2 | 8/2006 | Wellington et al. |
| 7,096,941 | B2 | 8/2006 | de Rouffignac et al. |
| 7,096,942 | B1 | 8/2006 | de Rouffignac et al. |
| 7,096,953 | B2 | 8/2006 | de Rouffignac et al. |
| 7,100,994 | B2 | 9/2006 | Vinegar et al. |
| 7,104,319 | B2 | 9/2006 | Vinegar et al. |
| 7,114,566 | B2 | 10/2006 | Vinegar et al. |
| 7,121,341 | B2 | 10/2006 | Vinegar et al. |
| 7,121,342 | B2 | 10/2006 | Vinegar et al. |
| 7,128,153 | B2 | 10/2006 | Vinegar et al. |
| 7,153,373 | B2 | 12/2006 | Maziasz et al. |
| 7,156,176 | B2 | 1/2007 | Vinegar et al. |
| 7,165,615 | B2 | 1/2007 | Vinegar et al. |
| 7,219,734 | B2 | 5/2007 | Bai et al. |
| 7,225,866 | B2 | 6/2007 | Berchenko et al. |
| 7,258,752 | B2 | 8/2007 | Maziasz et al. |
| 7,320,364 | B2 | 1/2008 | Fairbanks |
| 7,337,841 | B2 | 3/2008 | Ravie |
| 7,353,872 | B2 | 4/2008 | Sandberg et al. |
| 7,357,180 | B2 | 4/2008 | Vinegar et al. |
| 7,360,588 | B2 | 4/2008 | Vinegar et al. |
| 7,370,704 | B2 | 5/2008 | Harris |
| 7,383,877 | B2 | 6/2008 | Vinegar et al. |
| 7,424,915 | B2 | 9/2008 | Vinegar et al. |
| 7,431,076 | B2 | 10/2008 | Sandberg et al. |
| 7,435,037 | B2 | 10/2008 | McKinzie, II |
| 7,461,691 | B2 | 12/2008 | Vinegar et al. |
| 7,481,274 | B2 | 1/2009 | Vinegar et al. |
| 7,490,665 | B2 | 2/2009 | Sandberg et al. |
| 7,500,528 | B2 | 3/2009 | McKinzie, II et al. |
| 7,510,000 | B2 | 3/2009 | Pastor-Sanz et al. |
| 7,527,094 | B2 | 5/2009 | McKinzie et al. |
| 7,533,719 | B2 | 5/2009 | Hinson et al. |
| 7,540,324 | B2 | 6/2009 | de Rouffignac et al. |
| 7,546,873 | B2 | 6/2009 | Kim |
| 7,549,470 | B2 | 6/2009 | Vinegar et al. |
| 7,556,095 | B2 | 7/2009 | Vinegar |
| 7,556,096 | B2 | 7/2009 | Vinegar et al. |
| 7,559,367 | B2 | 7/2009 | Vinegar et al. |
| 7,559,368 | B2 | 7/2009 | Vinegar et al. |
| 7,562,706 | B2 | 7/2009 | Li et al. |
| 7,562,707 | B2 | 7/2009 | Miller |
| 7,575,052 | B2 | 8/2009 | Sandberg et al. |
| 7,575,053 | B2 | 8/2009 | Vinegar et al. |
| 7,581,589 | B2 | 9/2009 | Roes et al. |
| 7,584,789 | B2 | 9/2009 | Mo et al. |
| 7,591,310 | B2 | 9/2009 | Minderhoud et al. |
| 7,597,147 | B2 | 10/2009 | Vitek et al. |
| 7,604,052 | B2 | 10/2009 | Roes et al. |
| 7,610,962 | B2 | 11/2009 | Fowler |
| 7,631,689 | B2 | 12/2009 | Vinegar et al. |
| 7,631,690 | B2 | 12/2009 | Vinegar et al. |
| 7,635,023 | B2 | 12/2009 | Goldberg et al. |
| 7,635,024 | B2 | 12/2009 | Karanikas et al. |
| 7,635,025 | B2 | 12/2009 | Vinegar et al. |
| 7,640,980 | B2 | 1/2010 | Vinegar et al. |
| 7,644,765 | B2 | 1/2010 | Stegemeier et al. |
| 7,673,681 | B2 | 3/2010 | Vinegar et al. |
| 7,673,786 | B2 | 3/2010 | Menotti |
| 7,677,310 | B2 | 3/2010 | Vinegar et al. |
| 7,677,314 | B2 | 3/2010 | Hsu |
| 7,681,647 | B2 | 3/2010 | Mudunuri et al. |
| 7,683,296 | B2 | 3/2010 | Brady et al. |
| 7,703,513 | B2 | 4/2010 | Vinegar et al. |
| 7,717,171 | B2 | 5/2010 | Stegemeier et al. |
| 7,730,936 | B2 | 6/2010 | Hernandez-Solis et al. |
| 7,730,945 | B2 | 6/2010 | Pietersen et al. |
| 7,730,946 | B2 | 6/2010 | Vinegar et al. |
| 7,730,947 | B2 | 6/2010 | Stegemeier et al. |
| 7,735,935 | B2 | 6/2010 | Vinegar et al. |
| 7,785,427 | B2 | 8/2010 | Maziasz et al. |
| 7,793,722 | B2 | 9/2010 | Vinegar et al. |
| 7,798,220 | B2 | 9/2010 | Vinegar et al. |
| 7,798,221 | B2 | 9/2010 | Vinegar et al. |
| 7,831,133 | B2 | 11/2010 | Vinegar et al. |
| 7,831,134 | B2 | 11/2010 | Vinegar et al. |
| 7,832,484 | B2 | 11/2010 | Nguyen et al. |
| 7,841,401 | B2 | 11/2010 | Kuhlman et al. |
| 7,841,408 | B2 | 11/2010 | Vinegar |
| 7,841,425 | B2 | 11/2010 | Mansure et al. |
| 7,845,411 | B2 | 12/2010 | Vinegar et al. |
| 7,849,922 | B2 | 12/2010 | Vinegar et al. |
| 7,860,377 | B2 | 12/2010 | Vinegar et al. |
| 7,866,385 | B2 | 1/2011 | Lambirth |
| 7,866,386 | B2 | 1/2011 | Beer |
| 7,866,388 | B2 | 1/2011 | Bravo |
| 7,912,358 | B2 | 3/2011 | Stone et al. |
| 7,931,086 | B2 | 4/2011 | Nguyen et al. |
| 7,942,197 | B2 | 5/2011 | Fairbanks et al. |
| 7,942,203 | B2 | 5/2011 | Vinegar et al. |
| 7,950,453 | B2 | 5/2011 | Farmayan et al. |
| 7,986,869 | B2 | 7/2011 | Vinegar et al. |
| 8,011,451 | B2 | 9/2011 | MacDonald |
| 8,027,571 | B2 | 9/2011 | Vinegar et al. |
| 8,042,610 | B2 | 10/2011 | Harris et al. |
| 8,070,840 | B2 | 12/2011 | Diaz et al. |
| 8,146,661 | B2 | 4/2012 | Bravo et al. |
| 8,146,669 | B2 | 4/2012 | Mason |
| 8,151,880 | B2 | 4/2012 | Roes et al. |
| 8,151,907 | B2 | 4/2012 | MacDonald |
| 8,162,059 | B2 | 4/2012 | Nguyen et al. |
| 8,162,405 | B2 | 4/2012 | Burns et al. |
| 8,172,335 | B2 | 5/2012 | Burns et al. |
| 8,177,305 | B2 | 5/2012 | Burns et al. |
| 8,191,630 | B2 | 6/2012 | Stegemeier et al. |
| 8,192,682 | B2 | 6/2012 | Maziasz et al. |
| 8,196,658 | B2 | 6/2012 | Miller et al. |
| 2002/0027001 | A1 | 3/2002 | Wellington et al. |
| 2002/0028070 | A1 | 3/2002 | Holen |
| 2002/0033253 | A1 | 3/2002 | de Rouffignac et al. |
| 2002/0036089 | A1 | 3/2002 | Vinegar et al. |
| 2002/0038069 | A1 | 3/2002 | Wellington et al. |
| 2002/0040779 | A1 | 4/2002 | Wellington et al. |
| 2002/0040780 | A1 | 4/2002 | Wellington et al. |
| 2002/0053431 | A1 | 5/2002 | Wellington et al. |
| 2002/0076212 | A1 | 6/2002 | Zhang et al. |
| 2003/0066642 | A1 | 4/2003 | Wellington et al. |
| 2003/0079877 | A1 | 5/2003 | Wellington et al. |
| 2003/0085034 | A1 | 5/2003 | Wellington et al. |
| 2003/0146002 | A1 | 8/2003 | Vinegar et al. |
| 2003/0196789 | A1 | 10/2003 | Wellington et al. |
| 2003/0201098 | A1 | 10/2003 | Karanikas et al. |

| | | |
|---|---|---|
| 2004/0140096 A1 | 7/2004 | Sandberg et al. |
| 2004/0146288 A1 | 7/2004 | Vinegar et al. |
| 2005/0006097 A1 | 1/2005 | Sandberg et al. |
| 2005/0006128 A1 | 1/2005 | Mita et al. |
| 2006/0289536 A1 | 12/2006 | Vinegar et al. |
| 2007/0045268 A1 | 3/2007 | Vinegar et al. |
| 2007/0119098 A1 | 5/2007 | Diaz et al. |
| 2007/0127897 A1 | 6/2007 | John et al. |
| 2007/0131428 A1 | 6/2007 | den Boestert et al. |
| 2007/0133960 A1 | 6/2007 | Vinegar et al. |
| 2007/0173122 A1 | 7/2007 | Matsuoka |
| 2007/0193743 A1 | 8/2007 | Harris et al. |
| 2008/0035346 A1 | 2/2008 | Nair et al. |
| 2008/0073104 A1 | 3/2008 | Barberree et al. |
| 2008/0173442 A1 | 7/2008 | Vinegar et al. |
| 2008/0185138 A1* | 8/2008 | Hernandez-Solis et al. ..... 166/60 |
| 2008/0217321 A1 | 9/2008 | Vinegar et al. |
| 2009/0090158 A1 | 4/2009 | Davidson et al. |
| 2009/0095476 A1* | 4/2009 | Nguyen et al. ................. 166/302 |
| 2009/0095478 A1 | 4/2009 | Karanikas et al. |
| 2009/0095479 A1 | 4/2009 | Karanikas et al. |
| 2009/0120646 A1 | 5/2009 | Kim et al. |
| 2009/0126929 A1 | 5/2009 | Vinegar |
| 2009/0189617 A1 | 7/2009 | Burns et al. |
| 2009/0194269 A1 | 8/2009 | Vinegar |
| 2009/0194286 A1 | 8/2009 | Mason |
| 2009/0194287 A1 | 8/2009 | Nguyen et al. |
| 2009/0194329 A1 | 8/2009 | Guimerans et al. |
| 2009/0194333 A1 | 8/2009 | MacDonald |
| 2009/0194524 A1 | 8/2009 | Kim et al. |
| 2009/0200022 A1 | 8/2009 | Bravo et al. |
| 2009/0200023 A1 | 8/2009 | Costello et al. |
| 2009/0200031 A1 | 8/2009 | Miller et al. |
| 2009/0200290 A1 | 8/2009 | Cardinal et al. |
| 2009/0200854 A1 | 8/2009 | Vinegar |
| 2009/0260824 A1 | 10/2009 | Burns et al. |
| 2009/0272526 A1 | 11/2009 | Burns et al. |
| 2009/0272533 A1 | 11/2009 | Burns et al. |
| 2009/0272535 A1 | 11/2009 | Burns et al. |
| 2009/0272536 A1 | 11/2009 | Burns et al. |
| 2009/0272578 A1 | 11/2009 | MacDonald |
| 2009/0301724 A1 | 12/2009 | Roes et al. |
| 2009/0321417 A1 | 12/2009 | Burns et al. |
| 2010/0071903 A1 | 3/2010 | Prince-Wright et al. |
| 2010/0071904 A1 | 3/2010 | Burns et al. |
| 2010/0089584 A1 | 4/2010 | Burns |
| 2010/0089586 A1 | 4/2010 | Stanecki |
| 2010/0096137 A1 | 4/2010 | Nguyen et al. |
| 2010/0101783 A1 | 4/2010 | Vinegar et al. |
| 2010/0101784 A1 | 4/2010 | Vinegar et al. |
| 2010/0101794 A1 | 4/2010 | Ryan |
| 2010/0108310 A1 | 5/2010 | Fowler et al. |
| 2010/0108379 A1 | 5/2010 | Edbury et al. |
| 2010/0147521 A1 | 6/2010 | Xie et al. |
| 2010/0147522 A1 | 6/2010 | Xie et al. |
| 2010/0155070 A1 | 6/2010 | Roes et al. |
| 2010/0206570 A1 | 8/2010 | Ocampos et al. |
| 2010/0224368 A1* | 9/2010 | Mason .......................... 166/302 |
| 2010/0258265 A1 | 10/2010 | Karanikas et al. |
| 2010/0258290 A1 | 10/2010 | Bass |
| 2010/0258291 A1 | 10/2010 | de St. Remey et al. |
| 2010/0258309 A1 | 10/2010 | Ayodele et al. |
| 2011/0124223 A1 | 5/2011 | Tilley et al. |
| 2011/0124228 A1 | 5/2011 | Coles et al. |
| 2011/0132661 A1 | 6/2011 | Harmason et al. |
| 2011/0247808 A1 | 10/2011 | Nguyen |
| 2011/0247809 A1 | 10/2011 | Lin et al. |
| 2011/0247810 A1 | 10/2011 | Ocampos et al. |
| 2011/0247811 A1 | 10/2011 | Beer |
| 2011/0247820 A1 | 10/2011 | Marino et al. |

FOREIGN PATENT DOCUMENTS

| | | |
|---|---|---|
| CA | 1288043 | 8/1991 |
| EP | 107927 | 5/1984 |
| EP | 130671 | 9/1985 |
| GB | 1010023 | 11/1965 |
| GB | 1204405 | 9/1970 |
| JP | 2000340350 | 12/2000 |
| WO | 97/23924 | 7/1997 |
| WO | 00/19061 | 4/2000 |

OTHER PUBLICATIONS

New Zealand Intellectual Property Office, "Examination Report" for New Zealand Application No. 581359, mailed Nov. 23, 2010.

McGee et al. "Electrical Heating with Horizontal Wells, The heat Transfer Problem," International Conference on Horizontal Well Tehcnology, Calgary, Alberta Canada, 1996; 14 pages.

"IEEE Recommended Practice for Electrical Impedance, Induction, and Skin Effect Heating of Pipelines and Vessels," IEEE Std. 844-200, 2000; 6 pages.

U.S Patent and Trademark Office, Office Communication for U.S. Appl. No. 11/409,558; mailed Mar. 9, 2010.

U.S. Patent and Trademark Office, Office Communication for U.S. Appl. No. 11/409,565; mailed Mar. 5, 2010.

U.S. Patent and Trademark Office, "Office Communication," for U.S. Appl. No. 12/106,060 mailed Apr. 27, 2010.

U.S. Patent and Trademark Office, "Office Communication," for U.S. Appl. No. 11/112,881 mailed Apr. 28, 2006; 12 pages.

Bosch et al. "Evaluation of Downhole Electric Impedance Heating Systems for Paraffin Control in Oil Wells," IEEE Transactions on Industrial Applications, 1992, vol. 28; pp. 190-194.

Bosch et al., "Evaluation of Downhole Electric Impedance Heating Systems for Paraffin Control in Oil Wells," Industry Applications Society 37th Annual Petroleum and Chemical Industry Conference; The Institute of Electrical and Electronics Engineers Inc., Sep. 1990, pp. 223-227.

Rangel-German et al., "Electrical-Heating-Assisted Recovery for Heavy Oil", pp. 1-43. 2004.

Kovscek, Anthony R., "Reservoir Engineering analysis of Novel Thermal Oil Recovery Techniques applicable to Alaskan North Slope Heavy Oils", pp. 1-6.

PCT "International Search Report and Written Opinion" for International Application No. PCT/US10/52026, mailed, Dec. 17, 2010, 11 pages.

Swedish shale oil-Production methods in Sweden, Organisation for European Economic Cooperation, 1952, (70 pages).

PCT "International Search Report and Written Opinion" for International Application No. PCT/US10/52022, mailed, Dec. 10, 2010, 8 pages.

PCT "International Search Report and Written Opinion" for International Application No. PCT/US10/52027, mailed, Dec. 13, 2010, 8 pages.

Boggs, "The Case for Frequency Domain PD Testing in the Context of Distribution Cable", Electrical Insulation Magazine, IEEE, vol. 19, Issue 4, Jul.-Aug. 2003, pp. 13-19.

U.S. Patent and Trademark Office, Office Communication for U.S. Appl. No. 12/576,697; mailed Mar. 20, 2012.

U.S. Patent and Trademark Office, Office Communication for U.S. Appl. No. 12/576,707; mailed Dec. 20, 2011.

PCT "International Search Report and Written Opinion" for International Application No. PCT/US2011/031553, mailed, Jun. 8, 2011; 6 pages.

* cited by examiner

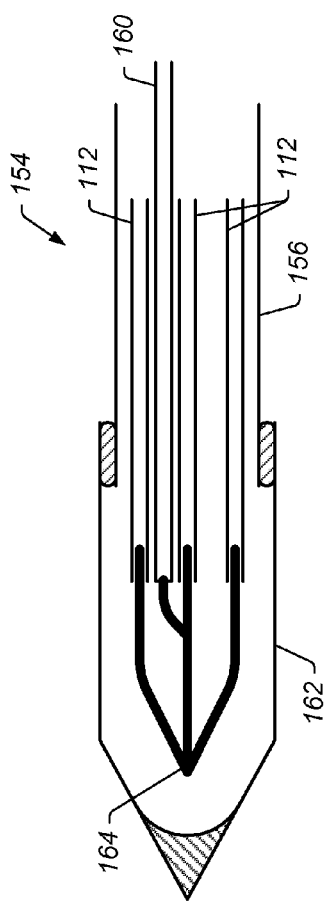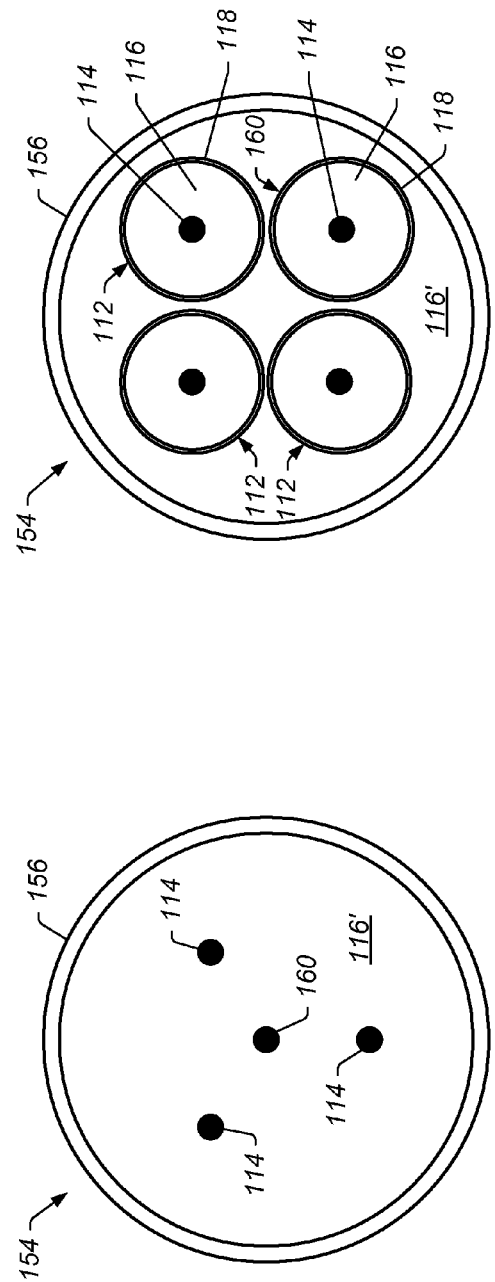

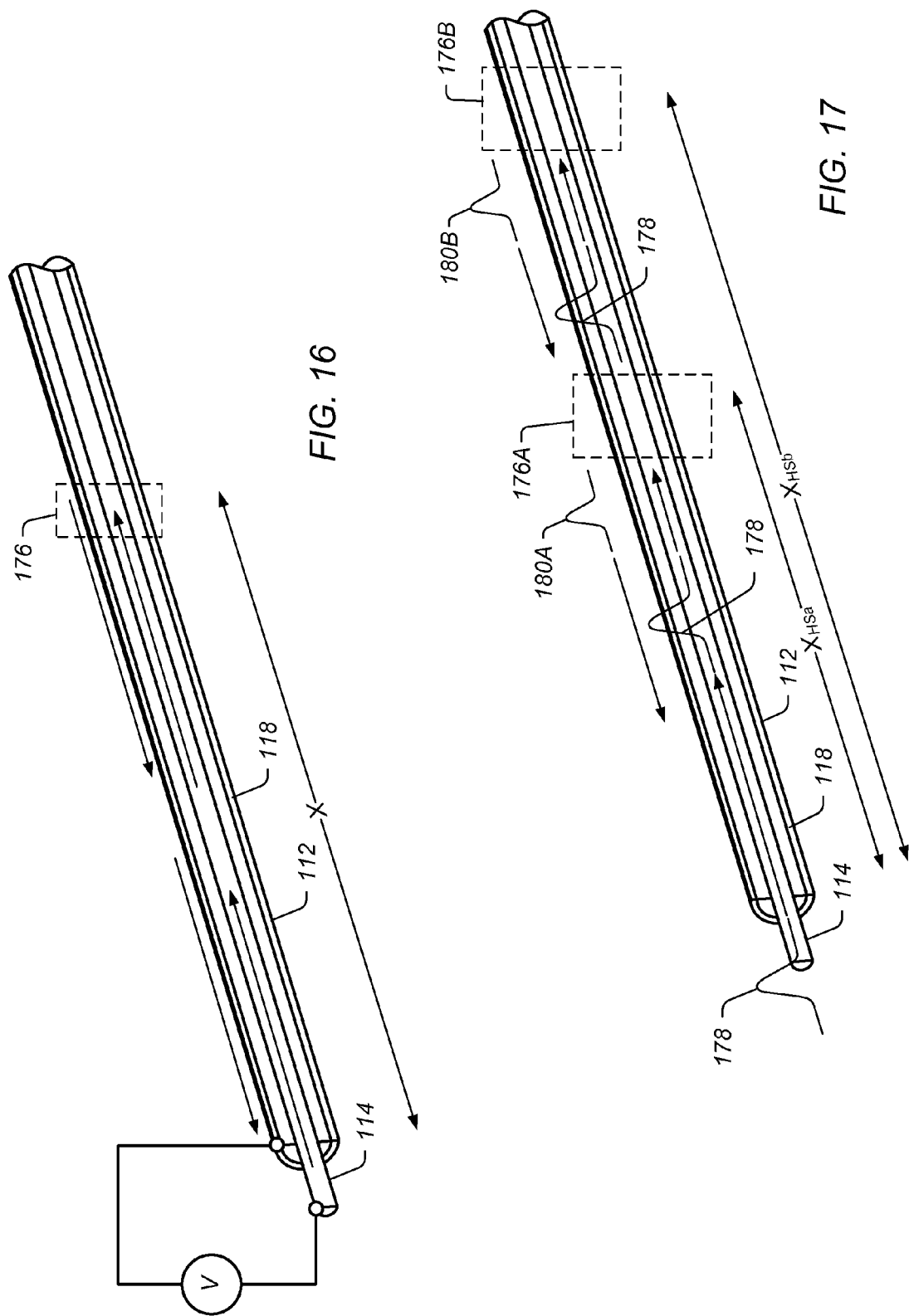

METHODS FOR ASSESSING A TEMPERATURE IN A SUBSURFACE FORMATION

PRIORITY CLAIM

This patent application claims priority to U.S. Provisional Patent No. 61/250,347 entitled "DISTRIBUTED TEMPERATURE MONITORING USING INSULATED CONDUCTORS" to Burns et al. filed on Oct. 9, 2009; and to U.S. Provisional Patent No. 61/250,353 entitled "SALT BASED DOWNHOLE TEMPERATURE MONITORS" to Nguyen et al. filed on Oct. 9, 2009; U.S. Provisional Patent No. 61/250,218 entitled "TREATING SUBSURFACE HYDROCARBON CONTAINING FORMATIONS AND THE SYSTEMS, METHODS, AND PROCESSES UTILIZED" to D' Angelo III et al. filed on Oct. 9, 2009; and U.S. Provisional Patent No. 61/322,513 entitled "TREATMENT METHODOLOGIES FOR SUBSURFACE HYDROCARBON CONTAINING FORMATIONS" to Bass et al. filed on Apr. 9, 2010, all of which are incorporated by reference in its entirety.

RELATED PATENTS

This patent application incorporates by reference in its entirety each of U.S. Pat. Nos. 6,688,387 to Wellington et al.; 6,991,036 to Sumnu-Dindoruk et al.; 6,698,515 to Karanikas et al.; 6,880,633 to Wellington et al.; 6,782,947 to de Rouffignac et al.; 6,991,045 to Vinegar et al.; 7,073,578 to Vinegar et al.; 7,121,342 to Vinegar et al.; 7,320,364 to Fairbanks; 7,527,094 to McKinzie et al.; 7,584,789 to Mo et al.; 7,533,719 to Hinson et al.; 7,562,707 to Miller; and 7,798,220 to Vinegar et al.; U.S. Patent Application Publication Nos. 2009-0189617 to Burns et al.; 2010-0071903 to Prince-Wright et al.; 2010-0096137 to Nguyen et al.; and U.S. patent application Ser. No. 12/757,621.

BACKGROUND

1. Field of the Invention

The present invention relates generally to methods and systems for production of hydrocarbons, hydrogen, and/or other products from various subsurface formations such as hydrocarbon containing formations.

2. Description of Related Art

Hydrocarbons obtained from subterranean formations are often used as energy resources, as feedstocks, and as consumer products. Concerns over depletion of available hydrocarbon resources and concerns over declining overall quality of produced hydrocarbons have led to development of processes for more efficient recovery, processing and/or use of available hydrocarbon resources. In situ processes may be used to remove hydrocarbon materials from subterranean formations that were previously inaccessible and/or too expensive to extract using available methods. Chemical and/or physical properties of hydrocarbon material in a subterranean formation may need to be changed to allow hydrocarbon material to be more easily removed from the subterranean formation and/or increase the value of the hydrocarbon material. The chemical and physical changes may include in situ reactions that produce removable fluids, composition changes, solubility changes, density changes, phase changes, and/or viscosity changes of the hydrocarbon material in the formation.

Large deposits of heavy hydrocarbons (heavy oil and/or tar) contained in relatively permeable formations (for example in tar sands) are found in North America, South America, Africa, and Asia. Tar can be surface-mined and upgraded to lighter hydrocarbons such as crude oil, naphtha, kerosene, and/or gas oil. Surface milling processes may further separate the bitumen from sand. The separated bitumen may be converted to light hydrocarbons using conventional refinery methods. Mining and upgrading tar sand is usually substantially more expensive than producing lighter hydrocarbons from conventional oil reservoirs. Typical temperature measurement methods may be difficult and/or expensive to implement for use in assessing a temperature profile of a heater located in a subsurface formation for heating in an in situ heat treatment process. The desire is for a temperature profile that includes multiple temperatures along the length or a portion of the heater in the subsurface formation. Thermocouples are one possible solution; however, thermocouples provide only one temperature at one location and two wires are generally needed for each thermocouple. The risk of failure of one or more of the thermocouples (or their associated wires) is increased with the use of multiple wires in the subsurface wellbore. Thus, to obtain a temperature profile along a length of the heater, multiple wires are needed.

SUMMARY

Embodiments described herein generally relate to systems, methods, and heaters for treating a subsurface formation. Embodiments described herein also generally relate to heaters that have novel components therein. Such heaters can be obtained by using the systems and methods described herein.

In certain embodiments, the invention provides one or more systems, methods, and/or heaters. In some embodiments, the systems, methods, and/or heaters are used for treating a subsurface formation.

In some embodiments, a method for assessing a temperature in an opening in a subsurface formation, comprises: assessing one or more dielectric properties along a length of an insulated conductor located in the opening; and assessing one or more temperatures along the length of the insulated conductor based on the one or more assessed dielectric properties. Assessing the one or more temperatures comprises comparing temperature dependence data of the dielectric properties to the assessed dielectric properties. At least one of the dielectric properties comprises a dielectric constant and/or a loss tangent. One or more assessed temperatures are above about 400° C. or in a range between about 400° C. and about 900° C. In some embodiments, one or more assessed temperatures are distributed at different locations along the length of the insulated conductor. In some embodiments, a length of the insulated conductor assessed comprises at most an upper half of the insulated conductor. The insulated conductor comprises a core, an insulation material surrounding the core, and an outer sheath surrounding the insulation material. In some embodiments, the insulated conductor comprises insulation material that has properties that vary along the length of the insulated conductor.

In some embodiments the method further comprises providing electrical power to at least a portion of the insulated conductor, and providing at least some heat to the subsurface formation from the portion of the insulated conductor.

In some embodiments, the method further comprises providing electrical power to at least one additional insulated conductor located in the opening, and providing at least some heat to the subsurface formation from the additional insulated conductor.

In some embodiments, the method further comprises assessing the one or more temperatures using a computational system configured to store temperature dependence data of the dielectric properties.

In some embodiments, a method for assessing a temperature at one or more locations in an opening in a subsurface formation, includes providing a voltage with at least one incident pulse to an insulated conductor locating in the opening, wherein at least a portion of the insulated conductor comprises a core substantially surrounded by an electrical insulator and a jacket, respectively, and the electrical insulator comprises a salt configured to melt in a desired temperature range; and assessing at least one location along the length of the insulated conductor at which the salt has melted by assessing at least one property of at least one pulse reflected from at least one of the locations at which the salt has melted.

In some embodiments, a method for assessing a temperature at one or more locations in an opening in a subsurface formation, includes providing a voltage with at least one incident pulse to an insulated conductor locating in the opening, wherein at least a portion of the insulated conductor comprises a core substantially surrounded by an electrical insulator and a jacket, respectively, and the electrical insulator comprises a salt configured to melt in a desired temperature range; and assessing at least one location along the length of the insulated conductor at which the salt has melted by assessing at least one property of at least one pulse reflected from at least one of the locations at which the salt has melted.

In further embodiments, features from specific embodiments may be combined with features from other embodiments. For example, features from one embodiment may be combined with features from any of the other embodiments.

In further embodiments, treating a subsurface formation is performed using any of the methods, systems, or heaters described herein.

In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which:

FIG. 8 depicts a side view representation of an embodiment of an end section of three insulated conductors in a conduit.

FIG. 9 depicts an embodiment of a heater with three insulated cores in a conduit.

FIG. 10 depicts an embodiment of a heater with three insulated conductors and an insulated return conductor in a conduit.

FIG. 16 depicts an embodiment of an insulated conductor with voltage applied to the core and the jacket of the insulated conductor.

FIG. 17 depicts an embodiment of an insulated conductor with multiple hot spots.

Figure 1:
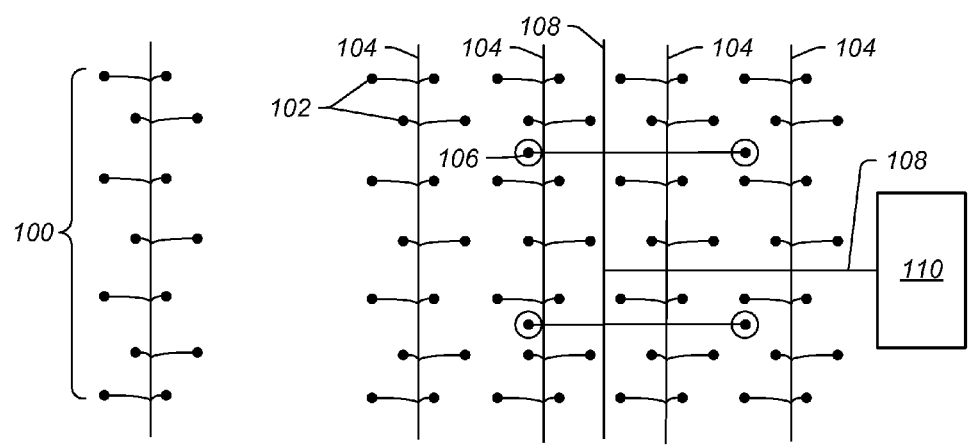
FIG. 1 shows a schematic view of an embodiment of a portion of an in situ heat treatment system for treating a hydrocarbon containing formation.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

The following description generally relates to systems and methods for treating hydrocarbons in the formations. Such formations may be treated to yield hydrocarbon products, hydrogen, and other products.

"Alternating current (AC)" refers to a time-varying current that reverses direction substantially sinusoidally. AC produces skin effect electricity flow in a ferromagnetic conductor.

"Annular region" is the region between an outer conduit and an inner conduit positioned in the outer conduit.

"API gravity" refers to API gravity at 15.5° C. (60° F.). API gravity is as determined by ASTM Method D6822 or ASTM Method D1298.

"ASTM" refers to American Standard Testing and Materials.

In the context of reduced heat output heating systems, apparatus, and methods, the term "automatically" means such systems, apparatus, and methods function in a certain way without the use of external control (for example, external controllers such as a controller with a temperature sensor and a feedback loop, PID controller, or predictive controller).

"Asphalt/bitumen" refers to a semi-solid, viscous material soluble in carbon disulfide. Asphalt/bitumen may be obtained from refining operations or produced from subsurface formations.

"Condensable hydrocarbons" are hydrocarbons that condense at 25° C. and one atmosphere absolute pressure. Condensable hydrocarbons may include a mixture of hydrocarbons having carbon numbers greater than 4. "Non-condensable hydrocarbons" are hydrocarbons that do not condense at 25° C. and one atmosphere absolute pressure. Non-condensable hydrocarbons may include hydrocarbons having carbon numbers less than 5.

"Coupled" means either a direct connection or an indirect connection (for example, one or more intervening connections) between one or more objects or components. The phrase "directly connected" means a direct connection between objects or components such that the objects or components are connected directly to each other so that the objects or components operate in a "point of use" manner.

"Curie temperature" is the temperature above which a ferromagnetic material loses all of its ferromagnetic properties. In addition to losing all of its ferromagnetic properties above the Curie temperature, the ferromagnetic material begins to lose its ferromagnetic properties when an increasing electrical current is passed through the ferromagnetic material.

"Diad" refers to a group of two items (for example, heaters, wellbores, or other objects) coupled together.

A "fluid" may be, but is not limited to, a gas, a liquid, an emulsion, a slurry, and/or a stream of solid particles that has flow characteristics similar to liquid flow.

A "formation" includes one or more hydrocarbon containing layers, one or more non-hydrocarbon layers, an overburden, and/or an underburden. "Hydrocarbon layers" refer to layers in the formation that contain hydrocarbons. The hydrocarbon layers may contain non-hydrocarbon material and hydrocarbon material. The "overburden" and/or the "underburden" include one or more different types of impermeable materials. For example, the overburden and/or underburden may include rock, shale, mudstone, or wet/tight carbonate. In some embodiments of in situ heat treatment processes, the overburden and/or the underburden may include a hydrocarbon containing layer or hydrocarbon containing layers that are relatively impermeable and are not subjected to temperatures during in situ heat treatment processing that result in significant characteristic changes of the hydrocarbon containing layers of the overburden and/or the underburden. For example, the underburden may contain shale or mudstone, but the underburden is not allowed to heat to pyrolysis temperatures during the in situ heat treatment process. In some cases, the overburden and/or the underburden may be somewhat permeable.

"Formation fluids" refer to fluids present in a formation and may include pyrolyzation fluid, synthesis gas, mobilized hydrocarbons, and water (steam). Formation fluids may include hydrocarbon fluids as well as non-hydrocarbon fluids. The term "mobilized fluid" refers to fluids in a hydrocarbon containing formation that are able to flow as a result of thermal treatment of the formation. "Produced fluids" refer to fluids removed from the formation.

A "heat source" is any system for providing heat to at least a portion of a formation substantially by conductive and/or radiative heat transfer. For example, a heat source may include electrically conducting materials and/or electric heaters such as an insulated conductor, an elongated member, and/or a conductor disposed in a conduit. A heat source may also include systems that generate heat by burning a fuel external to or in a formation. The systems may be surface burners, downhole gas burners, flameless distributed combustors, and natural distributed combustors. In some embodiments, heat provided to or generated in one or more heat sources may be supplied by other sources of energy. The other sources of energy may directly heat a formation, or the energy may be applied to a transfer medium that directly or indirectly heats the formation. It is to be understood that one or more heat sources that are applying heat to a formation may use different sources of energy. Thus, for example, for a given formation some heat sources may supply heat from electrically conducting materials or electric resistance heaters. Some heat sources may provide heat from combustion and some heat sources may provide heat from one or more other energy sources (for example, chemical reactions, solar energy, wind energy, biomass, or other sources of renewable energy). A chemical reaction may include an exothermic reaction (for example, an oxidation reaction). A heat source may also include an electrically conducting material and/or a heater that provides heat to a zone proximate and/or surrounding a heating location such as a heater well.

A "heater" is any system or heat source for generating heat in a well or a near wellbore region. Heaters may be, but are not limited to, electric heaters, burners, combustors that react with material in or produced from a formation, and/or combinations thereof.

"Heavy hydrocarbons" are viscous hydrocarbon fluids. Heavy hydrocarbons may include highly viscous hydrocarbon fluids such as heavy oil, tar, and/or asphalt. Heavy hydrocarbons may include carbon and hydrogen, as well as smaller concentrations of sulfur, oxygen, and nitrogen. Additional elements may also be present in heavy hydrocarbons in trace amounts. Heavy hydrocarbons may be classified by API gravity. Heavy hydrocarbons generally have an API gravity below about 20°. Heavy oil, for example, generally has an API gravity of about 10-20°, whereas tar generally has an API gravity below about 10°. The viscosity of heavy hydrocarbons is generally greater than about 100 centipoise at 15° C. Heavy hydrocarbons may include aromatics or other complex ring hydrocarbons.

Heavy hydrocarbons may be found in a relatively permeable formation. The relatively permeable formation may include heavy hydrocarbons entrained in, for example, sand or carbonate. "Relatively permeable" is defined, with respect to formations or portions thereof, as an average permeability of 10 millidarcy or more (for example, 10 or 100 millidarcy). "Relatively low permeability" is defined, with respect to formations or portions thereof, as an average permeability of less than about 10 millidarcy. One darcy is equal to about 0.99 square micrometers. An impermeable layer generally has a permeability of less than about 0.1 millidarcy.

Certain types of formations that include heavy hydrocarbons may also include, but are not limited to, natural mineral waxes or natural asphaltites. "Natural mineral waxes" typically occur in substantially tubular veins that may be several meters wide, several kilometers long, and hundreds of meters deep. "Natural asphaltites" include solid hydrocarbons of an aromatic composition and typically occur in large veins. In situ recovery of hydrocarbons from formations such as natural mineral waxes and natural asphaltites may include melting to form liquid hydrocarbons and/or solution mining of hydrocarbons from the formations.

"Hydrocarbons" are generally defined as molecules formed primarily by carbon and hydrogen atoms. Hydrocarbons may also include other elements such as, but not limited to, halogens, metallic elements, nitrogen, oxygen, and/or sulfur. Hydrocarbons may be, but are not limited to, kerogen, bitumen, pyrobitumen, oils, natural mineral waxes, and asphaltites. Hydrocarbons may be located in or adjacent to mineral matrices in the earth. Matrices may include, but are not limited to, sedimentary rock, sands, silicilytes, carbonates, diatomites, and other porous media. "Hydrocarbon fluids" are fluids that include hydrocarbons. Hydrocarbon fluids may include, entrain, or be entrained in non-hydrocarbon fluids such as hydrogen, nitrogen, carbon monoxide, carbon dioxide, hydrogen sulfide, water, and ammonia.

An "in situ conversion process" refers to a process of heating a hydrocarbon containing formation from heat sources to raise the temperature of at least a portion of the formation above a pyrolysis temperature so that pyrolyzation fluid is produced in the formation.

An "in situ heat treatment process" refers to a process of heating a hydrocarbon containing formation with heat sources to raise the temperature of at least a portion of the formation above a temperature that results in mobilized fluid, visbreaking, and/or pyrolysis of hydrocarbon containing material so that mobilized fluids, visbroken fluids, and/or pyrolyzation fluids are produced in the formation.

"Insulated conductor" refers to any elongated material that is able to conduct electricity and that is covered, in whole or in part, by an electrically insulating material.

"Kerogen" is a solid, insoluble hydrocarbon that has been converted by natural degradation and that principally contains carbon, hydrogen, nitrogen, oxygen, and sulfur. Coal and oil shale are typical examples of materials that contain kerogen. "Bitumen" is a non-crystalline solid or viscous hydrocarbon material that is substantially soluble in carbon disulfide. "Oil" is a fluid containing a mixture of condensable hydrocarbons.

"Modulated direct current (DC)" refers to any substantially non-sinusoidal time-varying current that produces skin effect electricity flow in a ferromagnetic conductor.

"Phase transformation temperature" of a ferromagnetic material refers to a temperature or a temperature range during which the material undergoes a phase change (for example, from ferrite to austenite) that decreases the magnetic permeability of the ferromagnetic material. The reduction in magnetic permeability is similar to reduction in magnetic permeability due to the magnetic transition of the ferromagnetic material at the Curie temperature.

"Pyrolysis" is the breaking of chemical bonds due to the application of heat. For example, pyrolysis may include transforming a compound into one or more other substances by heat alone. Heat may be transferred to a section of the formation to cause pyrolysis.

"Pyrolyzation fluids" or "pyrolysis products" refers to fluid produced substantially during pyrolysis of hydrocarbons. Fluid produced by pyrolysis reactions may mix with other fluids in a formation. The mixture would be considered pyrolyzation fluid or pyrolyzation product. As used herein, "pyrolysis zone" refers to a volume of a formation (for example, a relatively permeable formation such as a tar sands formation) that is reacted or reacting to form a pyrolyzation fluid.

"Subsidence" is a downward movement of a portion of a formation relative to an initial elevation of the surface.

"Superposition of heat" refers to providing heat from two or more heat sources to a selected section of a formation such that the temperature of the formation at least at one location between the heat sources is influenced by the heat sources.

"Tar" is a viscous hydrocarbon that generally has a viscosity greater than about 10,000 centipoise at 15° C. The specific gravity of tar generally is greater than 1.000. Tar may have an API gravity less than 10°.

A "tar sands formation" is a formation in which hydrocarbons are predominantly present in the form of heavy hydrocarbons and/or tar entrained in a mineral grain framework or other host lithology (for example, sand or carbonate). Examples of tar sands formations include formations such as the Athabasca formation, the Grosmont formation, and the Peace River formation, all three in Alberta, Canada; and the Faja formation in the Orinoco belt in Venezuela.

"Temperature limited heater" generally refers to a heater that regulates heat output (for example, reduces heat output) above a specified temperature without the use of external controls such as temperature controllers, power regulators, rectifiers, or other devices. Temperature limited heaters may be AC (alternating current) or modulated (for example, "chopped") DC (direct current) powered electrical resistance heaters.

"Thermally conductive fluid" includes fluid that has a higher thermal conductivity than air at standard temperature and pressure (STP) (0° C. and 101.325 kPa).

"Thermal conductivity" is a property of a material that describes the rate at which heat flows, in steady state, between two surfaces of the material for a given temperature difference between the two surfaces.

"Thermal fracture" refers to fractures created in a formation caused by expansion or contraction of a formation and/or fluids in the formation, which is in turn caused by increasing/decreasing the temperature of the formation and/or fluids in the formation, and/or by increasing/decreasing a pressure of fluids in the formation due to heating.

"Thickness" of a layer refers to the thickness of a cross section of the layer, wherein the cross section is normal to a face of the layer.

"Time-varying current" refers to electrical current that produces skin effect electricity flow in a ferromagnetic conductor and has a magnitude that varies with time. Time-varying current includes both alternating current (AC) and modulated direct current (DC).

"Triad" refers to a group of three items (for example, heaters, wellbores, or other objects) coupled together.

"Turndown ratio" for the temperature limited heater in which current is applied directly to the heater is the ratio of the highest AC or modulated DC resistance below the Curie temperature to the lowest resistance above the Curie temperature for a given current. Turndown ratio for an inductive heater is the ratio of the highest heat output below the Curie temperature to the lowest heat output above the Curie temperature for a given current applied to the heater.

A "u-shaped wellbore" refers to a wellbore that extends from a first opening in the formation, through at least a portion of the formation, and out through a second opening in the formation. In this context, the wellbore may be only roughly in the shape of a "v" or "u", with the understanding that the "legs" of the "u" do not need to be parallel to each other, or perpendicular to the "bottom" of the "u" for the wellbore to be considered "u-shaped".

"Upgrade" refers to increasing the quality of hydrocarbons. For example, upgrading heavy hydrocarbons may result in an increase in the API gravity of the heavy hydrocarbons.

"Visbreaking" refers to the untangling of molecules in fluid during heat treatment and/or to the breaking of large molecules into smaller molecules during heat treatment, which results in a reduction of the viscosity of the fluid.

"Viscosity" refers to kinematic viscosity at 40° C. unless otherwise specified. Viscosity is as determined by ASTM Method D445.

The term "wellbore" refers to a hole in a formation made by drilling or insertion of a conduit into the formation. A wellbore may have a substantially circular cross section, or another cross-sectional shape. As used herein, the terms "well" and "opening," when referring to an opening in the formation may be used interchangeably with the term "wellbore."

A formation may be treated in various ways to produce many different products. Different stages or processes may be used to treat the formation during an in situ heat treatment process. In some embodiments, one or more sections of the formation are solution mined to remove soluble minerals from the sections. Solution mining minerals may be performed before, during, and/or after the in situ heat treatment process. In some embodiments, the average temperature of one or more sections being solution mined may be maintained below about 120° C.

In some embodiments, one or more sections of the formation are heated to remove water from the sections and/or to remove methane and other volatile hydrocarbons from the sections. In some embodiments, the average temperature may be raised from ambient temperature to temperatures below about 220° C. during removal of water and volatile hydrocarbons.

In some embodiments, one or more sections of the formation are heated to temperatures that allow for movement and/or visbreaking of hydrocarbons in the formation. In some embodiments, the average temperature of one or more sections of the formation are raised to mobilization temperatures of hydrocarbons in the sections (for example, to temperatures ranging from 100° C. to 250° C., from 120° C. to 240° C., or from 150° C. to 230° C.).

In some embodiments, one or more sections are heated to temperatures that allow for pyrolysis reactions in the formation. In some embodiments, the average temperature of one or more sections of the formation may be raised to pyrolysis temperatures of hydrocarbons in the sections (for example, temperatures ranging from 230° C. to 900° C., from 240° C. to 400° C. or from 250° C. to 350° C.).

Heating the hydrocarbon containing formation with a plurality of heat sources may establish thermal gradients around the heat sources that raise the temperature of hydrocarbons in the formation to desired temperatures at desired heating rates. The rate of temperature increase through the mobilization temperature range and/or the pyrolysis temperature range for desired products may affect the quality and quantity of the formation fluids produced from the hydrocarbon containing formation. Slowly raising the temperature of the formation through the mobilization temperature range and/or pyrolysis temperature range may allow for the production of high quality, high API gravity hydrocarbons from the formation. Slowly raising the temperature of the formation through the mobilization temperature range and/or pyrolysis temperature range may allow for the removal of a large amount of the hydrocarbons present in the formation as hydrocarbon product.

In some in situ heat treatment embodiments, a portion of the formation is heated to a desired temperature instead of slowly heating the temperature through a temperature range. In some embodiments, the desired temperature is 300° C., 325° C., or 350° C. Other temperatures may be selected as the desired temperature.

Superposition of heat from heat sources allows the desired temperature to be relatively quickly and efficiently established in the formation. Energy input into the formation from the heat sources may be adjusted to maintain the temperature in the formation substantially at a desired temperature.

Mobilization and/or pyrolysis products may be produced from the formation through production wells. In some embodiments, the average temperature of one or more sections is raised to mobilization temperatures and hydrocarbons are produced from the production wells. The average temperature of one or more of the sections may be raised to pyrolysis temperatures after production due to mobilization decreases below a selected value. In some embodiments, the average temperature of one or more sections may be raised to pyrolysis temperatures without significant production before reaching pyrolysis temperatures. Formation fluids including pyrolysis products may be produced through the production wells.

In some embodiments, the average temperature of one or more sections may be raised to temperatures sufficient to allow synthesis gas production after mobilization and/or pyrolysis. In some embodiments, hydrocarbons may be raised to temperatures sufficient to allow synthesis gas production without significant production before reaching the temperatures sufficient to allow synthesis gas production. For example, synthesis gas may be produced in a temperature range from about 400° C. to about 1200° C., about 500° C. to about 1100° C., or about 550° C. to about 1000° C. A synthesis gas generating fluid (for example, steam and/or water) may be introduced into the sections to generate synthesis gas. Synthesis gas may be produced from production wells.

Solution mining, removal of volatile hydrocarbons and water, mobilizing hydrocarbons, pyrolyzing hydrocarbons, generating synthesis gas, and/or other processes may be performed during the in situ heat treatment process. In some embodiments, some processes may be performed after the in situ heat treatment process. Such processes may include, but are not limited to, recovering heat from treated sections, storing fluids (for example, water and/or hydrocarbons) in previously treated sections, and/or sequestering carbon dioxide in previously treated sections.

FIG. 1 depicts a schematic view of an embodiment of a portion of the in situ heat treatment system for treating the hydrocarbon containing formation. The in situ heat treatment system may include barrier wells 100. Barrier wells are used to form a barrier around a treatment area. The barrier inhibits fluid flow into and/or out of the treatment area. Barrier wells include, but are not limited to, dewatering wells, vacuum wells, capture wells, injection wells, grout wells, freeze wells, or combinations thereof. In some embodiments, barrier wells 100 are dewatering wells. Dewatering wells may remove liquid water and/or inhibit liquid water from entering a portion of the formation to be heated, or to the formation being heated. As shown, barrier wells 100 extend only along one side of heat sources 102, but the barrier wells typically encircle all heat sources 102 used, or to be used, to heat a treatment area of the formation.

Heat sources 102 are placed in at least a portion of the formation. Heat sources 102 may include heaters such as insulated conductors, conductor-in-conduit heaters, surface burners, flameless distributed combustors, and/or natural distributed combustors. Heat sources 102 may also include other types of heaters. Heat sources 102 provide heat to at least a portion of the formation to heat hydrocarbons in the formation. Energy may be supplied to heat sources 102 through supply lines 104. Supply lines 104 may be structurally different depending on the type of heat source or heat sources used to heat the formation. Supply lines 104 for heat sources may transmit electricity for electric heaters, may transport fuel for combustors, or may transport heat exchange fluid that is circulated in the formation. In some embodiments, electricity for an in situ heat treatment process may be provided by a nuclear power plant or nuclear power plants. The use of nuclear power may allow for reduction or elimination of carbon dioxide emissions from the in situ heat treatment process.

When the formation is heated, the heat input into the formation may cause expansion of the formation and geomechanical motion. The heat sources may be turned on before, at the same time, or during a dewatering process. Computer simulations may model formation response to heating. The computer simulations may be used to develop a pattern and time sequence for activating heat sources in the formation so that geomechanical motion of the formation does not adversely affect the functionality of heat sources, production wells, and other equipment in the formation.

Heating the formation may cause an increase in permeability and/or porosity of the formation. Increases in permeability and/or porosity may result from a reduction of mass in the formation due to vaporization and removal of water, removal of hydrocarbons, and/or creation of fractures. Fluid may flow more easily in the heated portion of the formation because of the increased permeability and/or porosity of the formation. Fluid in the heated portion of the formation may move a considerable distance through the formation because of the increased permeability and/or porosity. The considerable distance may be over 1000 m depending on various factors, such as permeability of the formation, properties of the fluid, temperature of the formation, and pressure gradient allowing movement of the fluid. The ability of fluid to travel considerable distance in the formation allows production wells 106 to be spaced relatively far apart in the formation.

Production wells 106 are used to remove formation fluid from the formation. In some embodiments, production well 106 includes a heat source. The heat source in the production well may heat one or more portions of the formation at or near the production well. In some in situ heat treatment process embodiments, the amount of heat supplied to the formation from the production well per meter of the production well is less than the amount of heat applied to the formation from a heat source that heats the formation per meter of the heat source. Heat applied to the formation from the production well may increase formation permeability adjacent to the production well by vaporizing and removing liquid phase fluid adjacent to the production well and/or by increasing the permeability of the formation adjacent to the production well by formation of macro and/or micro fractures.

More than one heat source may be positioned in the production well. A heat source in a lower portion of the production well may be turned off when superposition of heat from adjacent heat sources heats the formation sufficiently to counteract benefits provided by heating the formation with the production well. In some embodiments, the heat source in an upper portion of the production well may remain on after the heat source in the lower portion of the production well is deactivated. The heat source in the upper portion of the well may inhibit condensation and reflux of formation fluid.

In some embodiments, the heat source in production well 106 allows for vapor phase removal of formation fluids from the formation. Providing heating at or through the production well may: (1) inhibit condensation and/or refluxing of production fluid when such production fluid is moving in the production well proximate the overburden, (2) increase heat input into the formation, (3) increase production rate from the production well as compared to a production well without a heat source, (4) inhibit condensation of high carbon number compounds ($C_6$ hydrocarbons and above) in the production well, and/or (5) increase formation permeability at or proximate the production well.

Subsurface pressure in the formation may correspond to the fluid pressure generated in the formation. As temperatures in the heated portion of the formation increase, the pressure in the heated portion may increase as a result of thermal expansion of in situ fluids, increased fluid generation and vaporization of water. Controlling rate of the fluid removal from the formation may allow for control of pressure in the formation. Pressure in the formation may be determined at a number of different locations, such as near or at production wells, near or at heat sources, and near or at monitor wells.

In some hydrocarbon containing formations, production of hydrocarbons from the formation is inhibited until at least some hydrocarbons in the formation have been mobilized and/or pyrolyzed. Formation fluid may be produced from the formation when the formation fluid is of a selected quality. In some embodiments, the selected quality includes an API gravity of at least about 20°, 30°, or 40°. Inhibiting production until at least some hydrocarbons are mobilized and/or pyrolyzed may increase conversion of heavy hydrocarbons to light hydrocarbons. Inhibiting initial production may minimize the production of heavy hydrocarbons from the formation. Production of substantial amounts of heavy hydrocarbons may require expensive equipment and/or reduce the life of production equipment.

In some hydrocarbon containing formations, hydrocarbons in the formation may be heated to mobilization and/or pyrolysis temperatures before substantial permeability has been generated in the heated portion of the formation. An initial lack of permeability may inhibit the transport of generated fluids to production wells 106. During initial heating, fluid pressure in the formation may increase proximate heat sources 102. The increased fluid pressure may be released, monitored, altered, and/or controlled through one or more heat sources 102. For example, selected heat sources 102 or separate pressure relief wells may include pressure relief valves that allow for removal of some fluid from the formation.

In some embodiments, pressure generated by expansion of mobilized fluids, pyrolysis fluids or other fluids generated in the formation may be allowed to increase although an open path to production wells 106 or any other pressure sink may not yet exist in the formation. The fluid pressure may be allowed to increase towards a lithostatic pressure. Fractures in the hydrocarbon containing formation may form when the fluid approaches the lithostatic pressure. For example, fractures may form from heat sources 102 to production wells 106 in the heated portion of the formation. The generation of fractures in the heated portion may relieve some of the pressure in the portion. Pressure in the formation may have to be maintained below a selected pressure to inhibit unwanted production, fracturing of the overburden or underburden, and/or coking of hydrocarbons in the formation.

After mobilization and/or pyrolysis temperatures are reached and production from the formation is allowed, pressure in the formation may be varied to alter and/or control a composition of produced formation fluid, to control a percentage of condensable fluid as compared to non-condensable fluid in the formation fluid, and/or to control an API gravity of formation fluid being produced. For example, decreasing pressure may result in production of a larger condensable fluid component. The condensable fluid component may contain a larger percentage of olefins.

In some in situ heat treatment process embodiments, pressure in the formation may be maintained high enough to promote production of formation fluid with an API gravity of greater than 20°. Maintaining increased pressure in the formation may inhibit formation subsidence during in situ heat treatment. Maintaining increased pressure may reduce or eliminate the need to compress formation fluids at the surface to transport the fluids in collection conduits to treatment facilities.

Maintaining increased pressure in a heated portion of the formation may surprisingly allow for production of large quantities of hydrocarbons of increased quality and of relatively low molecular weight. Pressure may be maintained so that formation fluid produced has a minimal amount of compounds above a selected carbon number. The selected carbon number may be at most 25, at most 20, at most 12, or at most 8. Some high carbon number compounds may be entrained in vapor in the formation and may be removed from the formation with the vapor. Maintaining increased pressure in the formation may inhibit entrainment of high carbon number compounds and/or multi-ring hydrocarbon compounds in the vapor. High carbon number compounds and/or multi-ring hydrocarbon compounds may remain in a liquid phase in the formation for significant time periods. The significant time periods may provide sufficient time for the compounds to pyrolyze to form lower carbon number compounds.

Generation of relatively low molecular weight hydrocarbons is believed to be due, in part, to autogenous generation and reaction of hydrogen in a portion of the hydrocarbon containing formation. For example, maintaining an increased pressure may force hydrogen generated during pyrolysis into the liquid phase within the formation. Heating the portion to a temperature in a pyrolysis temperature range may pyrolyze hydrocarbons in the formation to generate liquid phase pyrolyzation fluids. The generated liquid phase pyrolyzation fluids components may include double bonds and/or radicals. Hydrogen ($H_2$) in the liquid phase may reduce double bonds of the generated pyrolyzation fluids, thereby reducing a potential for polymerization or formation of long chain compounds from the generated pyrolyzation fluids. In addition, $H_2$ may also neutralize radicals in the generated pyrolyzation fluids. $H_2$ in the liquid phase may inhibit the generated pyrolyzation fluids from reacting with each other and/or with other compounds in the formation.

Formation fluid produced from production wells 106 may be transported through collection piping 108 to treatment facilities 110. Formation fluids may also be produced from heat sources 102. For example, fluid may be produced from heat sources 102 to control pressure in the formation adjacent to the heat sources. Fluid produced from heat sources 102 may be transported through tubing or piping to collection piping 108 or the produced fluid may be transported through tubing or piping directly to treatment facilities 110. Treatment facilities 110 may include separation units, reaction units, upgrading units, fuel cells, turbines, storage vessels, and/or other systems and units for processing produced formation fluids. The treatment facilities may form transportation fuel from at least a portion of the hydrocarbons produced from the formation. In some embodiments, the transportation fuel may be jet fuel, such as JP-8.

Temperature limited heaters may be in configurations and/or may include materials that provide automatic temperature limiting properties for the heater at certain temperatures. Examples of temperature limited heaters may be found in U.S. Pat. No. 6,688,387 to Wellington et al.; U.S. Pat. No. 6,991,036 to Sumnu-Dindoruk et al.; U.S. Pat. No. 6,698,515 to Karanikas et al.; U.S. Pat. No. 6,880,633 to Wellington et al.; U.S. Pat. No. 6,782,947 to de Rouffignac et al.; U.S. Pat. No. 6,991,045 to Vinegar et al.; U.S. Pat. No. 7,073,578 to Vinegar et al.; U.S. Pat. No. 7,121,342 to Vinegar et al.; U.S. Pat. No. 7,320,364 to Fairbanks; U.S. Pat. No. 7,527,094 to McKinzie et al.; U.S. Pat. No. 7,584,789 to Mo et al.; U.S. Pat. No. 7,533,719 to Hinson et al.; and U.S. Pat. No. 7,562,707 to Miller; U.S. Patent Application Publication Nos. 2009-0071652 to Vinegar et al.; 2009-0189617 to Burns et al.; 2010-0071903 to Prince-Wright et al.; and 2010-0096137 to Nguyen et al., each of which is incorporated by reference as if fully set forth herein. Temperature limited heaters are dimensioned to operate with AC frequencies (for example, 60 Hz AC) or with modulated DC current.

In certain embodiments, ferromagnetic materials are used in temperature limited heaters. Ferromagnetic material may self-limit temperature at or near the Curie temperature of the material and/or the phase transformation temperature range to provide a reduced amount of heat when a time-varying current is applied to the material. In certain embodiments, the ferromagnetic material self-limits temperature of the temperature limited heater at a selected temperature that is approximately the Curie temperature and/or in the phase transformation temperature range. In certain embodiments, the selected temperature is within about 35° C., within about 25° C., within about 20° C., or within about 10° C. of the Curie temperature and/or the phase transformation temperature range. In certain embodiments, ferromagnetic materials are coupled with other materials (for example, highly conductive materials, high strength materials, corrosion resistant materials, or combinations thereof) to provide various electrical and/or mechanical properties. Some parts of the temperature limited heater may have a lower resistance (caused by different geometries and/or by using different ferromagnetic and/or non-ferromagnetic materials) than other parts of the temperature limited heater. Having parts of the temperature limited heater with various materials and/or dimensions allows for tailoring the desired heat output from each part of the heater.

Temperature limited heaters may be more reliable than other heaters. Temperature limited heaters may be less apt to break down or fail due to hot spots in the formation. In some embodiments, temperature limited heaters allow for substantially uniform heating of the formation. In some embodiments, temperature limited heaters are able to heat the formation more efficiently by operating at a higher average heat output along the entire length of the heater. The temperature limited heater operates at the higher average heat output along the entire length of the heater because power to the heater does not have to be reduced to the entire heater, as is the case with typical constant wattage heaters, if a temperature along any point of the heater exceeds, or is about to exceed, a maximum operating temperature of the heater. Heat output from portions of a temperature limited heater approaching a Curie temperature and/or the phase transformation temperature range of the heater automatically reduces without controlled adjustment of the time-varying current applied to the heater. The heat output automatically reduces due to changes in electrical properties (for example, electrical resistance) of portions of the temperature limited heater. Thus, more power is supplied by the temperature limited heater during a greater portion of a heating process.

In certain embodiments, the system including temperature limited heaters initially provides a first heat output and then provides a reduced (second heat output) heat output, near, at, or above the Curie temperature and/or the phase transformation temperature range of an electrically resistive portion of the heater when the temperature limited heater is energized by a time-varying current. The first heat output is the heat output at temperatures below which the temperature limited heater begins to self-limit. In some embodiments, the first heat output is the heat output at a temperature about 50° C., about 75° C., about 100° C., or about 125° C. below the Curie temperature and/or the phase transformation temperature range of the ferromagnetic material in the temperature limited heater.

The temperature limited heater may be energized by time-varying current (alternating current or modulated direct current) supplied at the wellhead. The wellhead may include a power source and other components (for example, modulation components, transformers, and/or capacitors) used in supplying power to the temperature limited heater. The temperature limited heater may be one of many heaters used to heat a portion of the formation.

In certain embodiments, the temperature limited heater includes a conductor that operates as a skin effect or proximity effect heater when time-varying current is applied to the conductor. The skin effect limits the depth of current penetration into the interior of the conductor. For ferromagnetic materials, the skin effect is dominated by the magnetic permeability of the conductor. The relative magnetic permeability of ferromagnetic materials is typically between 10 and 1000 (for example, the relative magnetic permeability of ferromagnetic materials is typically at least 10 and may be at least 50, 100, 500, 1000 or greater). As the temperature of the ferromagnetic material is raised above the Curie temperature, or the phase transformation temperature range, and/or as the applied electrical current is increased, the magnetic permeability of the ferromagnetic material decreases substantially and the skin depth expands rapidly (for example, the skin depth expands as the inverse square root of the magnetic permeability). The reduction in magnetic permeability results in a decrease in the AC or modulated DC resistance of the conductor near, at, or above the Curie temperature, the phase transformation temperature range, and/or as the applied electrical current is increased. When the temperature limited heater is powered by a substantially constant current source, portions of the heater that approach, reach, or are above the Curie temperature and/or the phase transformation temperature range may have reduced heat dissipation. Sections of the temperature limited heater that are not at or near the Curie temperature and/or the phase transformation temperature range may be dominated by skin effect heating that allows the heater to have high heat dissipation due to a higher resistive load.

Curie temperature heaters have been used in soldering equipment, heaters for medical applications, and heating elements for ovens (for example, pizza ovens). Some of these uses are disclosed in U.S. Pat. No. 5,579,575 to Lamome et al.; U.S. Pat. No. 5,065,501 to Henschen et al.; and U.S. Pat. No. 5,512,732 to Yagnik et al.; U.S. Pat. No. 4,849,611 to Whitney et al. each of which is incorporated by reference describes a plurality of discrete, spaced-apart heating units including a reactive component, a resistive heating component, and a temperature responsive component.

An advantage of using the temperature limited heater to heat hydrocarbons in the formation is that the conductor is chosen to have a Curie temperature and/or a phase transformation temperature range in a desired range of temperature operation. Operation within the desired operating temperature range allows substantial heat injection into the formation while maintaining the temperature of the temperature limited heater, and other equipment, below design limit temperatures. Design limit temperatures are temperatures at which properties such as corrosion, creep, and/or deformation are adversely affected. The temperature limiting properties of the temperature limited heater inhibit overheating or burnout of the heater adjacent to low thermal conductivity "hot spots" in the formation. In some embodiments, the temperature limited heater is able to lower or control heat output and/or withstand heat at temperatures above 25° C., 37° C., 100° C., 250° C., 500° C., 700° C., 800° C., 900° C., or higher up to 1131° C., depending on the materials used in the heater.

The temperature limited heater allows for more heat injection into the formation than constant wattage heaters because the energy input into the temperature limited heater does not have to be limited to accommodate low thermal conductivity regions adjacent to the heater. For example, in Green River oil shale there is a difference of at least a factor of 3 in the thermal conductivity of the lowest richness oil shale layers and the highest richness oil shale layers. When heating such a formation, substantially more heat is transferred to the formation with the temperature limited heater than with the conventional heater that is limited by the temperature at low thermal conductivity layers. The heat output along the entire length of the conventional heater needs to accommodate the low thermal conductivity layers so that the heater does not overheat at the low thermal conductivity layers and burn out. The heat output adjacent to the low thermal conductivity layers that are at high temperature will reduce for the temperature limited heater, but the remaining portions of the temperature limited heater that are not at high temperature will still provide high heat output. Because heaters for heating hydrocarbon formations typically have long lengths (for example, at least 10 m, 100 m, 300 m, 500 m, 1 km or more up to about 10 km), the majority of the length of the temperature limited heater may be operating below the Curie temperature and/or the phase transformation temperature range while only a few portions are at or near the Curie temperature and/or the phase transformation temperature range of the temperature limited heater.

The use of temperature limited heaters allows for efficient transfer of heat to the formation. Efficient transfer of heat allows for reduction in time needed to heat the formation to a desired temperature. For example, in Green River oil shale, pyrolysis typically requires 9.5 years to 10 years of heating when using a 12 m heater well spacing with conventional constant wattage heaters. For the same heater spacing, temperature limited heaters may allow a larger average heat output while maintaining heater equipment temperatures below equipment design limit temperatures. Pyrolysis in the formation may occur at an earlier time with the larger average heat output provided by temperature limited heaters than the lower average heat output provided by constant wattage heaters. For example, in Green River oil shale, pyrolysis may occur in 5 years using temperature limited heaters with a 12 m heater well spacing. Temperature limited heaters counteract hot spots due to inaccurate well spacing or drilling where heater wells come too close together. In certain embodiments, temperature limited heaters allow for increased power output over time for heater wells that have been spaced too far apart, or limit power output for heater wells that are spaced too close together. Temperature limited heaters also supply more power in regions adjacent the overburden and underburden to compensate for temperature losses in these regions.

Temperature limited heaters may be advantageously used in many types of formations. For example, in tar sands formations or relatively permeable formations containing heavy hydrocarbons, temperature limited heaters may be used to provide a controllable low temperature output for reducing the viscosity of fluids, mobilizing fluids, and/or enhancing the radial flow of fluids at or near the wellbore or in the formation. Temperature limited heaters may be used to inhibit excess coke formation due to overheating of the near wellbore region of the formation.

In some embodiments, the use of temperature limited heaters eliminates or reduces the need for expensive temperature control circuitry. For example, the use of temperature limited heaters eliminates or reduces the need to perform temperature logging and/or the need to use fixed thermocouples on the heaters to monitor potential overheating at hot spots.

The temperature limited heaters may be used in conductor-in-conduit heaters. In some embodiments of conductor-in-conduit heaters, the majority of the resistive heat is generated in the conductor, and the heat radiatively, conductively and/or convectively transfers to the conduit. In some embodiments of conductor-in-conduit heaters, the majority of the resistive heat is generated in the conduit.

In some embodiments, a relatively thin conductive layer is used to provide the majority of the electrically resistive heat output of the temperature limited heater at temperatures up to a temperature at or near the Curie temperature and/or the phase transformation temperature range of the ferromagnetic conductor. Such a temperature limited heater may be used as the heating member in an insulated conductor heater. The heating member of the insulated conductor heater may be located inside a sheath with an insulation layer between the sheath and the heating member.

An insulated conductor may be used as an electric heater element of a heater or a heat source. The insulated conductor may include an inner electrical conductor (core) surrounded by an electrical insulator and an outer electrical conductor (jacket). The electrical insulator may include mineral insulation (for example, magnesium oxide) or other electrical insulation.

In certain embodiments, the insulated conductor is placed in an opening in a hydrocarbon containing formation. In some embodiments, the insulated conductor is placed in an uncased opening in the hydrocarbon containing formation. Placing the insulated conductor in an uncased opening in the hydrocarbon containing formation may allow heat transfer from the insulated conductor to the formation by radiation as well as conduction. Using an uncased opening may facilitate retrieval of the insulated conductor from the well, if necessary.

In some embodiments, an insulated conductor is placed within a casing in the formation; may be cemented within the formation; or may be packed in an opening with sand, gravel, or other fill material. The insulated conductor may be supported on a support member positioned within the opening. The support member may be a cable, rod, or a conduit (for example, a pipe). The support member may be made of a metal, ceramic, inorganic material, or combinations thereof. Because portions of a support member may be exposed to formation fluids and heat during use, the support member may be chemically resistant and/or thermally resistant.

Ties, spot welds, and/or other types of connectors may be used to couple the insulated conductor to the support member at various locations along a length of the insulated conductor. The support member may be attached to a wellhead at an upper surface of the formation. In some embodiments, the insulated conductor has sufficient structural strength such that a support member is not needed. The insulated conductor may, in many instances, have at least some flexibility to inhibit thermal expansion damage when undergoing temperature changes.

In certain embodiments, insulated conductors are placed in wellbores without support members and/or centralizers. An insulated conductor without support members and/or centralizers may have a suitable combination of temperature and corrosion resistance, creep strength, length, thickness (diameter), and metallurgy that will inhibit failure of the insulated conductor during use.

Figure 2:
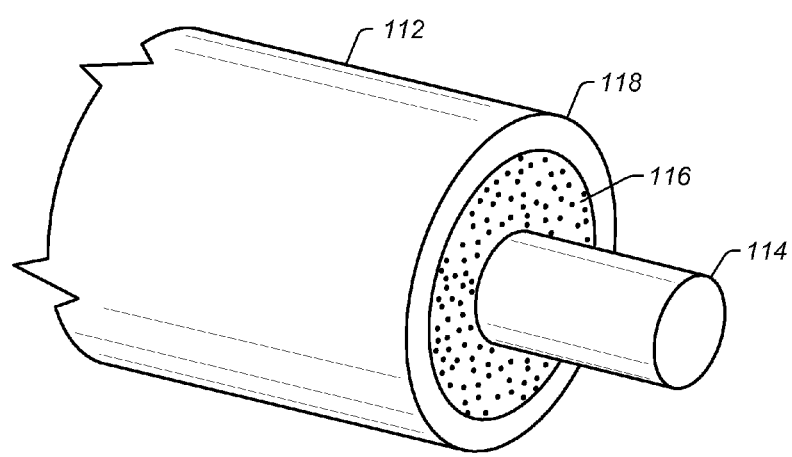
FIG. 2 depicts an embodiment of an insulated conductor heat source.

FIG. 2 depicts a perspective view of an end portion of an embodiment of insulated conductor 112. Insulated conductor 112 may have any desired cross-sectional shape such as, but not limited to, round (depicted in FIG. 2), triangular, ellipsoidal, rectangular, hexagonal, or irregular. In certain embodiments, insulated conductor 112 includes core 114, electrical insulator 116, and jacket 118. Core 114 may resistively heat when an electrical current passes through the core. Alternating or time-varying current and/or direct current may be used to provide power to core 114 such that the core resistively heats.

In some embodiments, electrical insulator 116 inhibits current leakage and arcing to jacket 118. Electrical insulator 116 may thermally conduct heat generated in core 114 to jacket 118. Jacket 118 may radiate or conduct heat to the formation. In certain embodiments, insulated conductor 112 is 1000 m or more in length. Longer or shorter insulated conductors may also be used to meet specific application needs. The dimensions of core 114, electrical insulator 116, and jacket 118 of insulated conductor 112 may be selected such that the insulated conductor has enough strength to be self supporting even at upper working temperature limits. Such insulated conductors may be suspended from wellheads or supports positioned near an interface between an overburden and a hydrocarbon containing formation without the need for support members extending into the hydrocarbon containing formation along with the insulated conductors.

Insulated conductor 112 may be designed to operate at power levels of up to about 1650 watts/meter or higher. In certain embodiments, insulated conductor 112 operates at a power level between about 500 watts/meter and about 1150 watts/meter when heating a formation. Insulated conductor 112 may be designed so that a maximum voltage level at a typical operating temperature does not cause substantial thermal and/or electrical breakdown of electrical insulator 116. Insulated conductor 112 may be designed such that jacket 118 does not exceed a temperature that will result in a significant reduction in corrosion resistance properties of the jacket material. In certain embodiments, insulated conductor 112 may be designed to reach temperatures within a range between about 650° C. and about 900° C. Insulated conductors having other operating ranges may be formed to meet specific operational requirements.

As shown in FIG. 2, insulated conductor 112 has a single core 114. In some embodiments, insulated conductor 112 has two or more cores 114. For example, a single insulated conductor may have three cores. Core 114 may be made of metal or another electrically conductive material. The material used to form core 114 may include, but not be limited to, nichrome, copper, nickel, carbon steel, stainless steel, and combinations thereof. In certain embodiments, core 114 is chosen to have a diameter and a resistivity at operating temperatures such that its resistance, as derived from Ohm's law, makes it electrically and structurally stable for the chosen power dissipation per meter, the length of the heater, and/or the maximum voltage allowed for the core material.

In some embodiments, core 114 is made of different materials along a length of insulated conductor 112. For example, a first section of core 114 may be made of a material that has a significantly lower resistance than a second section of the core. The first section may be placed adjacent to a formation layer that does not need to be heated to as high a temperature as a second formation layer that is adjacent to the second section. The resistivity of various sections of core 114 may be adjusted by having a variable diameter and/or by having core sections made of different materials.

Electrical insulator 116 may be made of a variety of materials. Commonly used powders may include, but are not limited to, magnesium oxide (MgO), alumina trioxide ($Al_2O_3$), zirconia, beryllium oxide (BeO), different chemical variations of spinels, and combinations thereof. Magnesium oxide may provide good thermal conductivity and electrical insulation properties. The desired electrical insulation properties include low leakage current and high dielectric strength. A low leakage current decreases the possibility of thermal breakdown and the high dielectric strength decreases the possibility of arcing across the insulator. Thermal breakdown can occur if the leakage current causes a progressive rise in the temperature of the insulator leading also to arcing across the insulator.

Jacket 118 may be an outer metallic layer or electrically conductive layer. Jacket 118 may be in contact with hot formation fluids. Jacket 118 may be made of material having a high resistance to corrosion at elevated temperatures. Alloys that may be used in a desired operating temperature range of jacket 118 include, but are not limited to, 304 stainless steel, 310 stainless steel, Incoloy® 800, and Inconel® 600 (Inco Alloys International, Huntington, W. Va., U.S.A.). The thickness of jacket 118 may have to be sufficient to last for three to ten years in a hot and corrosive environment. A thickness of jacket 118 may generally vary between about 1 mm and about 2.5 mm. For example, a 1.3 mm thick, 310 stainless steel outer layer may be used as jacket 118 to provide good chemical resistance to sulfidation corrosion in a heated zone of a formation for a period of over 3 years. Larger or smaller jacket thicknesses may be used to meet specific application requirements.

One or more insulated conductors may be placed within an opening in a formation to form a heat source or heat sources. Electrical current may be passed through each insulated conductor in the opening to heat the formation. Alternately, electrical current may be passed through selected insulated conductors in an opening. The unused conductors may be used as backup heaters. Insulated conductors may be electrically coupled to a power source in any convenient manner Each end of an insulated conductor may be coupled to lead-in cables that pass through a wellhead. Such a configuration typically has a 180° bend (a "hairpin" bend) or turn located near a bottom of the heat source. An insulated conductor that includes a 180° bend or turn may not require a bottom termination, but the 180° bend or turn may be an electrical and/or structural weakness in the heater. Insulated conductors may be electrically coupled together in series, in parallel, or in series and parallel combinations. In some embodiments of heat sources, electrical current may pass into the conductor of an insulated conductor and may be returned through the jacket of the insulated conductor by connecting core 114 to jacket 118 (shown in FIG. 2) at the bottom of the heat source.

Figure 3:
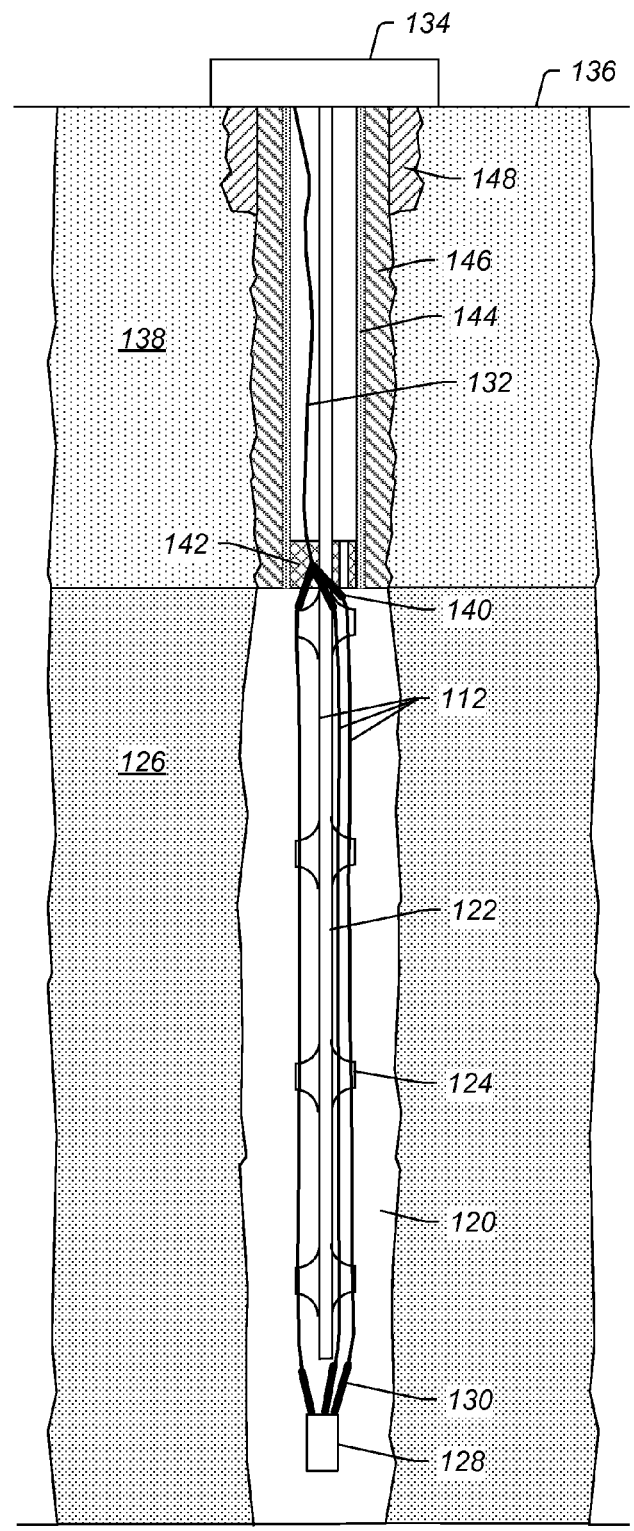
FIG. 3 depicts another embodiment of an insulated conductor heat source.
Figure 4:
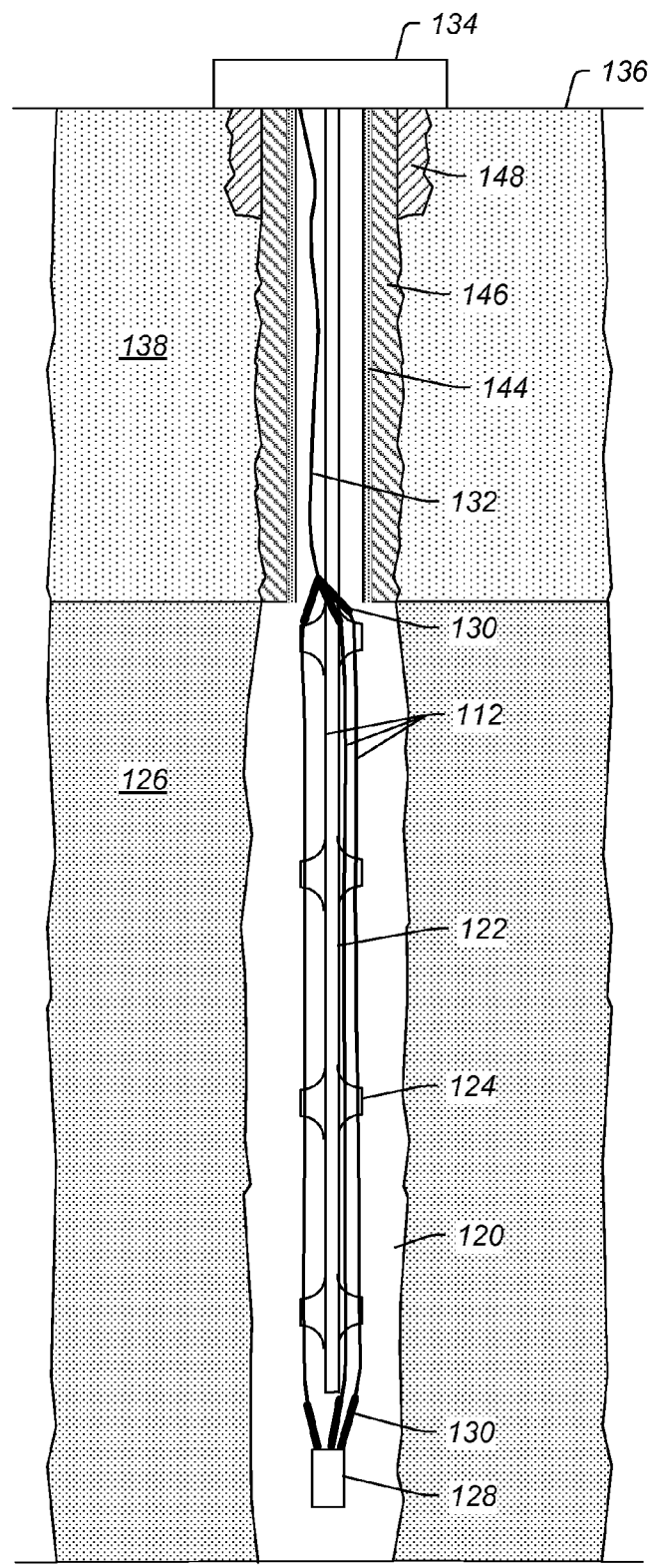
FIG. 4 depicts another embodiment of an insulated conductor heat source.

In some embodiments, three insulated conductors 112 are electrically coupled in a 3-phase wye configuration to a power supply. FIG. 3 depicts an embodiment of three insulated conductors in an opening in a subsurface formation coupled in a wye configuration. FIG. 4 depicts an embodiment of three insulated conductors 112 that are removable from opening 120 in the formation. No bottom connection may be required for three insulated conductors in a wye configuration. Alternately, all three insulated conductors of the wye configuration may be connected together near the bottom of the opening. The connection may be made directly at ends of heating sections of the insulated conductors or at ends of cold pins (less resistive sections) coupled to the heating sections at the bottom of the insulated conductors. The bottom connections may be made with insulator filled and sealed canisters or with epoxy filled canisters. The insulator may be the same composition as the insulator used as the electrical insulation.

Three insulated conductors 112 depicted in FIGS. 3 and 4 may be coupled to support member 122 using centralizers 124. Alternatively, insulated conductors 112 may be strapped directly to support member 122 using metal straps. Centralizers 124 may maintain a location and/or inhibit movement of insulated conductors 112 on support member 122. Centralizers 124 may be made of metal, ceramic, or combinations thereof. The metal may be stainless steel or any other type of metal able to withstand a corrosive and high temperature environment. In some embodiments, centralizers 124 are bowed metal strips welded to the support member at distances less than about 6 m. A ceramic used in centralizer 124 may be, but is not limited to, Al2O3, MgO, or another electrical insulator. Centralizers 124 may maintain a location of insulated conductors 112 on support member 122 such that movement of insulated conductors is inhibited at operating temperatures of the insulated conductors. Insulated conductors 112 may also be somewhat flexible to withstand expansion of support member 122 during heating.

Support member 122, insulated conductor 112, and centralizers 124 may be placed in opening 120 in hydrocarbon layer 126. Insulated conductors 112 may be coupled to bottom conductor junction 128 using cold pin 130. Bottom conductor junction 128 may electrically couple each insulated conductor 112 to each other. Bottom conductor junction 128 may include materials that are electrically conducting and do not melt at temperatures found in opening 120. Cold pin 130 may be an insulated conductor having lower electrical resistance than insulated conductor 112.

Lead-in conductor 132 may be coupled to wellhead 134 to provide electrical power to insulated conductor 112. Lead-in conductor 132 may be made of a relatively low electrical resistance conductor such that relatively little heat is generated from electrical current passing through the lead-in conductor. In some embodiments, the lead-in conductor is a rubber or polymer insulated stranded copper wire. In some embodiments, the lead-in conductor is a mineral insulated conductor with a copper core. Lead-in conductor 132 may couple to wellhead 134 at surface 136 through a sealing flange located between overburden 138 and surface 136. The sealing flange may inhibit fluid from escaping from opening 120 to surface 136.

In certain embodiments, lead-in conductor 132 is coupled to insulated conductor 112 using transition conductor 140. Transition conductor 140 may be a less resistive portion of insulated conductor 112. Transition conductor 140 may be referred to as "cold pin" of insulated conductor 112. Transition conductor 140 may be designed to dissipate about one-tenth to about one-fifth of the power per unit length as is dissipated in a unit length of the primary heating section of insulated conductor 112. Transition conductor 140 may typically be between about 1.5 m and about 15 m, although shorter or longer lengths may be used to accommodate specific application needs. In an embodiment, the conductor of transition conductor 140 is copper. The electrical insulator of transition conductor 140 may be the same type of electrical insulator used in the primary heating section. A jacket of transition conductor 140 may be made of corrosion resistant material.

In certain embodiments, transition conductor 140 is coupled to lead-in conductor 132 by a splice or other coupling joint. Splices may also be used to couple transition conductor 140 to insulated conductor 112. Splices may have to withstand a temperature equal to half of a target zone operating temperature. Density of electrical insulation in the splice should in many instances be high enough to withstand the required temperature and the operating voltage.

In some embodiments, as shown in FIG. 3, packing material 142 is placed between overburden casing 144 and opening 120. In some embodiments, reinforcing material 146 may secure overburden casing 144 to overburden 138. Packing material 142 may inhibit fluid from flowing from opening 120 to surface 136. Reinforcing material 146 may include, for example, Class G or Class H Portland cement mixed with silica flour for improved high temperature performance, slag or silica flour, and/or a mixture thereof. In some embodiments, reinforcing material 146 extends radially a width of from about 5 cm to about 25 cm.

As shown in FIGS. 3 and 4, support member 122 and lead-in conductor 132 may be coupled to wellhead 134 at surface 136 of the formation. Surface conductor 148 may enclose reinforcing material 146 and couple to wellhead 134. Embodiments of surface conductors may extend to depths of approximately 3 meter to approximately 515 meter into an opening in the formation. Alternatively, the surface conductor may extend to a depth of approximately 9 m into the formation. Electrical current may be supplied from a power source to insulated conductor 112 to generate heat due to the electrical resistance of the insulated conductor. Heat generated from three insulated conductors 112 may transfer within opening 120 to heat at least a portion of hydrocarbon layer 126.

Heat generated by insulated conductors 112 may heat at least a portion of a hydrocarbon containing formation. In some embodiments, heat is transferred to the formation substantially by radiation of the generated heat to the formation. Some heat may be transferred by conduction or convection of heat due to gases present in the opening. The opening may be an uncased opening, as shown in FIGS. 3 and 4. An uncased opening eliminates cost associated with thermally cementing the heater to the formation, costs associated with a casing, and/or costs of packing a heater within an opening. In addition, heat transfer by radiation is typically more efficient than by conduction, so the heaters may be operated at lower temperatures in an open wellbore. Conductive heat transfer during initial operation of a heat source may be enhanced by the addition of a gas in the opening. The gas may be maintained at a pressure up to about 27 bars absolute. The gas may include, but is not limited to, carbon dioxide and/or helium. An insulated conductor heater in an open wellbore may advantageously be free to expand or contract to accommodate thermal expansion and contraction. An insulated conductor heater may advantageously be removable or redeployable from an open wellbore.

In certain embodiments, an insulated conductor heater assembly is installed or removed using a spooling assembly. More than one spooling assembly may be used to install both the insulated conductor and a support member simultaneously. Alternatively, the support member may be installed using a coiled tubing unit. The heaters may be un-spooled and connected to the support as the support is inserted into the well. The electric heater and the support member may be un-spooled from the spooling assemblies. Spacers may be coupled to the support member and the heater along a length of the support member. Additional spooling assemblies may be used for additional electric heater elements.

Figure 5A:
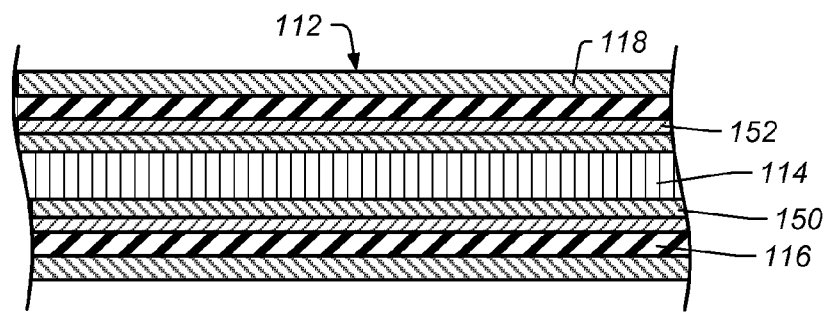
FIGS. 5A and 5B depict cross-sectional representations of an embodiment of a temperature limited heater component used in an insulated conductor heater.
Figure 5B:
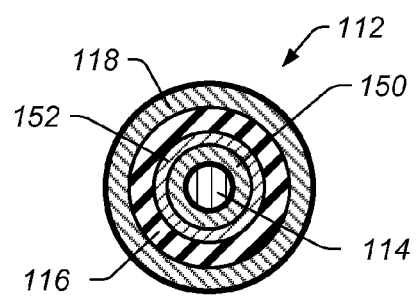

FIGS. 5A and 5B depict cross-sectional representations of an embodiment of the insulated conductor heater with the temperature limited heater as the heating member. Insulated conductor 112 includes core 114, ferromagnetic conductor 150, inner conductor 152, electrical insulator 116, and jacket 118. Core 114 is a copper core. Ferromagnetic conductor 150 is, for example, iron or an iron alloy.

Inner conductor 152 is a relatively thin conductive layer of non-ferromagnetic material with a higher electrical conductivity than ferromagnetic conductor 150. In certain embodiments, inner conductor 152 is copper. Inner conductor 152 may be a copper alloy. Copper alloys typically have a flatter resistance versus temperature profile than pure copper. A flatter resistance versus temperature profile may provide less variation in the heat output as a function of temperature up to the Curie temperature and/or the phase transformation temperature range. In some embodiments, inner conductor 152 is copper with 6% by weight nickel (for example, CuNi6 or LOHM™). In some embodiments, inner conductor 152 is CuNi$_{10}$Fe$_1$Mn alloy. Below the Curie temperature and/or the phase transformation temperature range of ferromagnetic conductor 150, the magnetic properties of the ferromagnetic conductor confine the majority of the flow of electrical current to inner conductor 152. Thus, inner conductor 152 provides the majority of the resistive heat output of insulated conductor 112 below the Curie temperature and/or the phase transformation temperature range.

In certain embodiments, inner conductor 152 is dimensioned, along with core 114 and ferromagnetic conductor 150, so that the inner conductor provides a desired amount of heat output and a desired turndown ratio. For example, inner conductor 152 may have a cross-sectional area that is around 2 or 3 times less than the cross-sectional area of core 114. Typically, inner conductor 152 has to have a relatively small cross-sectional area to provide a desired heat output if the inner conductor is copper or copper alloy. In an embodiment with copper inner conductor 152, core 114 has a diameter of 0.66 cm, ferromagnetic conductor 150 has an outside diameter of 0.91 cm, inner conductor 152 has an outside diameter of 1.03 cm, electrical insulator 116 has an outside diameter of 1.53 cm, and jacket 118 has an outside diameter of 1.79 cm. In an embodiment with a CuNi$_6$ inner conductor 152, core 114 has a diameter of 0.66 cm, ferromagnetic conductor 150 has an outside diameter of 0.91 cm, inner conductor 152 has an outside diameter of 1.12 cm, electrical insulator 116 has an outside diameter of 1.63 cm, and jacket 118 has an outside diameter of 1.88 cm. Such insulated conductors are typically smaller and cheaper to manufacture than insulated conductors that do not use the thin inner conductor to provide the majority of heat output below the Curie temperature and/or the phase transformation temperature range.

Electrical insulator 116 may be magnesium oxide, aluminum oxide, silicon dioxide, beryllium oxide, boron nitride, silicon nitride, or combinations thereof. In certain embodiments, electrical insulator 116 is a compacted powder of magnesium oxide. In some embodiments, electrical insulator 116 includes beads of silicon nitride.

In certain embodiments, a small layer of material is placed between electrical insulator 116 and inner conductor 152 to inhibit copper from migrating into the electrical insulator at higher temperatures. For example, a small layer of nickel (for example, about 0.5 mm of nickel) may be placed between electrical insulator 116 and inner conductor 152.

Jacket 118 is made of a corrosion resistant material such as, but not limited to, 347 stainless steel, 347H stainless steel, 446 stainless steel, or 825 stainless steel. In some embodiments, jacket 118 provides some mechanical strength for insulated conductor 112 at or above the Curie temperature and/or the phase transformation temperature range of ferromagnetic conductor 150. In certain embodiments, jacket 118 is not used to conduct electrical current.

For long vertical temperature limited heaters (for example, heaters at least 300 m, at least 500 m, or at least 1 km in length), the hanging stress becomes important in the selection of materials for the temperature limited heater. Without the proper selection of material, the support member may not have sufficient mechanical strength (for example, creep-rupture strength) to support the weight of the temperature limited heater at the operating temperatures of the heater.

In certain embodiments, materials for the support member are varied to increase the maximum allowable hanging stress at operating temperatures of the temperature limited heater and, thus, increase the maximum operating temperature of the temperature limited heater. Altering the materials of the support member affects the heat output of the temperature limited heater below the Curie temperature and/or the phase transformation temperature range because changing the materials changes the resistance versus temperature profile of the support member. In certain embodiments, the support member is made of more than one material along the length of the heater so that the temperature limited heater maintains desired operating properties (for example, resistance versus temperature profile below the Curie temperature and/or the phase transformation temperature range) as much as possible while providing sufficient mechanical properties to support the heater. In some embodiments, transition sections are used between sections of the heater to provide strength that compensates for the difference in temperature between sections of the heater. In certain embodiments, one or more portions of the temperature limited heater have varying outside diameters and/or materials to provide desired properties for the heater.

In certain embodiments of temperature limited heaters, three temperature limited heaters are coupled together in a three-phase wye configuration. Coupling three temperature limited heaters together in the three-phase wye configuration lowers the current in each of the individual temperature limited heaters because the current is split between the three individual heaters. Lowering the current in each individual temperature limited heater allows each heater to have a small diameter. The lower currents allow for higher relative magnetic permeabilities in each of the individual temperature limited heaters and, thus, higher turndown ratios. In addition, there may be no return current path needed for each of the individual temperature limited heaters. Thus, the turndown ratio remains higher for each of the individual temperature limited heaters than if each temperature limited heater had its own return current path.

In the three-phase wye configuration, individual temperature limited heaters may be coupled together by shorting the sheaths, jackets, or canisters of each of the individual temperature limited heaters to the electrically conductive sections (the conductors providing heat) at their terminating ends (for example, the ends of the heaters at the bottom of a heater wellbore). In some embodiments, the sheaths, jackets, canisters, and/or electrically conductive sections are coupled to a support member that supports the temperature limited heaters in the wellbore.

In certain embodiments, coupling multiple heaters (for example, mineral insulated conductor heaters) to a single power source, such as a transformer, is advantageous. Coupling multiple heaters to a single transformer may result in using fewer transformers to power heaters used for a treatment area as compared to using individual transformers for each heater. Using fewer transformers reduces surface congestion and allows easier access to the heaters and surface components. Using fewer transformers reduces capital costs associated with providing power to the treatment area. In some embodiments, at least 4, at least 5, at least 10, at least 25, at least 35, or at least 45 heaters are powered by a single transformer. Additionally, powering multiple heaters (in different heater wells) from the single transformer may reduce overburden losses because of reduced voltage and/or phase differences between each of the heater wells powered by the single transformer. Powering multiple heaters from the single transformer may inhibit current imbalances between the heaters because the heaters are coupled to the single transformer.

To provide power to multiple heaters using the single transformer, the transformer may have to provide power at higher voltages to carry the current to each of the heaters effectively. In certain embodiments, the heaters are floating (ungrounded) heaters in the formation. Floating the heaters allows the heaters to operate at higher voltages. In some embodiments, the transformer provides power output of at least about 3 kV, at least about 4 kV, at least about 5 kV, or at least about 6 kV.

Figure 6:
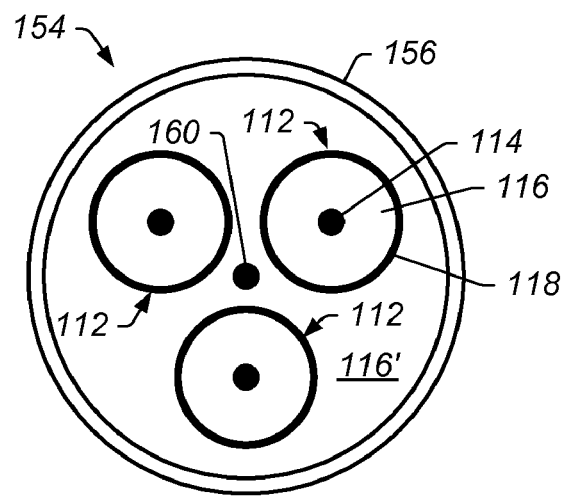
FIG. 6 depicts a top view representation of three insulated conductors in a conduit.

FIG. 6 depicts a top view representation of heater 154 with three insulated conductors 112 in conduit 156. Heater 154 may be located in a heater well in the subsurface formation. Conduit 156 may be a sheath, jacket, or other enclosure around insulated conductors 112. Each insulated conductor 112 includes core 114, electrical insulator 116, and jacket 118. Insulated conductors 112 may be mineral insulated conductors with core 114 being a copper alloy (for example, a copper-nickel alloy such as Alloy 180), electrical insulator 116 being magnesium oxide, and jacket 118 being Incoloy® 825 (registered trademark of Inco Alloys International, USA), copper, or stainless steel (for example 347H stainless steel). In some embodiments, jacket 118 includes non-work hardenable metals so that the jacket is annealable.

In some embodiments, core 114 and/or jacket 118 include ferromagnetic materials. In some embodiments, one or more insulated conductors 112 are temperature limited heaters. In certain embodiments, the overburden portion of insulated conductors 112 include high electrical conductivity materials in core 114 (for example, pure copper or copper alloys such as copper with 3% silicon at a weld joint) so that the overburden portions of the insulated conductors provide little or no heat output. In certain embodiments, conduit 156 includes non-corrosive materials and/or high strength materials such as stainless steel. In one embodiment, conduit 156 is 347H stainless steel.

Insulated conductors 112 may be coupled to the single transformer in a three-phase configuration (for example, a three-phase wye configuration). Each insulated conductor 112 may be coupled to one phase of the single transformer. In certain embodiments, the single transformer is also coupled to a plurality of identical heaters 154 in other heater wells in the formation (for example, the single transformer may couple to 40 or more heaters in the formation). In some embodiments, the single transformer couples to at least 4, at least 5, at least 10, at least 15, or at least 25 additional heaters in the formation.

Electrical insulator 116' may be located inside conduit 156 to electrically insulate insulated conductors 112 from the conduit. In certain embodiments, electrical insulator 116' is magnesium oxide (for example, compacted magnesium oxide). In some embodiments, electrical insulator 116' is silicon nitride (for example, silicon nitride blocks). Electrical insulator 116' electrically insulates insulated conductors 112 from conduit 156 so that at high operating voltages (for example, 3 kV or higher), there is no arcing between the conductors and the conduit. In some embodiments, electrical insulator 116' inside conduit 156 has at least the thickness of electrical insulators 116 in insulated conductors 112. The increased thickness of insulation in heater 154 (from electrical insulators 116 and/or electrical insulator 116') inhibits and may prevent current leakage into the formation from the heater. In some embodiments, electrical insulator 116' spatially locates insulated conductors 112 inside conduit 156.

Figure 7:
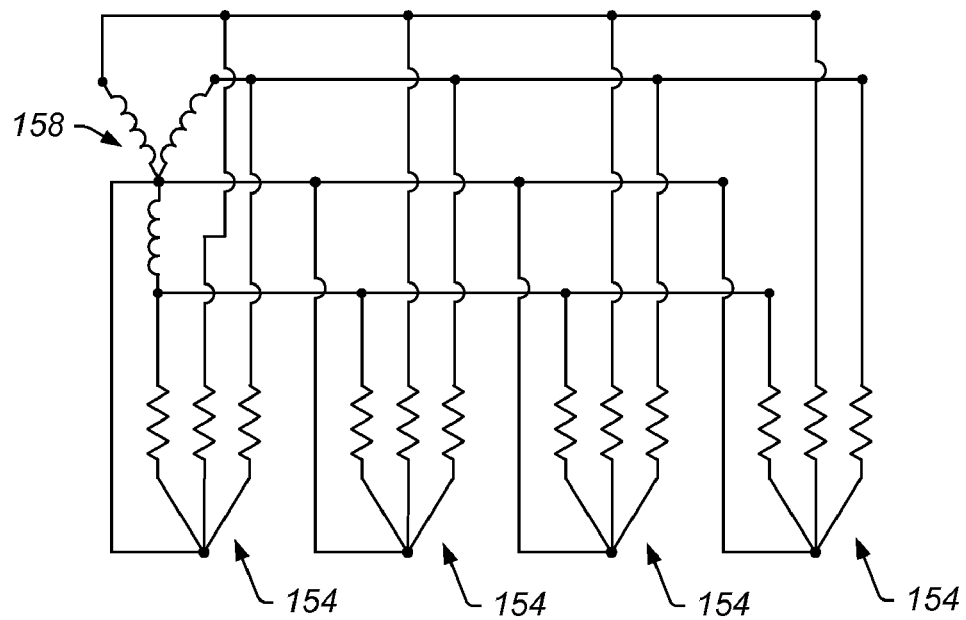
FIG. 7 depicts an embodiment of a three-phase wye transformer coupled to a plurality of heaters.

FIG. 7 depicts an embodiment of three-phase wye transformer 158 coupled to a plurality of heaters 154. For simplicity in the drawing, only four heaters 154 are shown in FIG. 7. It is to be understood that several more heaters may be coupled to the transformer 158. As shown in FIG. 7, each leg (each insulated conductor) of each heater is coupled to one phase of transformer 158 and current is returned to the neutral or ground of the transformer (for example, returned through conductor 160 depicted in FIGS. 6 and 8).

Return conductor 160 may be electrically coupled to the ends of insulated conductors 112 (as shown in FIG. 8). Current returns from the ends of the insulated conductors to the transformer on the surface of the formation. Return conductor 160 may include high electrical conductivity materials such as pure copper, nickel, copper alloys, or combinations thereof so that the return conductor provides little or no heat output. In some embodiments, return conductor 160 is a tubular (for example, a stainless steel tubular) that allows an optical fiber to be placed inside the tubular to be used for temperature and/or other measurement. In some embodiments, return conductor 160 is a small insulated conductor (for example, small mineral insulated conductor). Return conductor 160 may be coupled to the neutral or ground leg of the transformer in a three-phase wye configuration. Thus, insulated conductors 112 are electrically isolated from conduit 156 and the formation. Using return conductor 160 to return current to the surface may make coupling the heater to a wellhead easier. In some embodiments, current is returned using one or more of jackets 118, depicted in FIG. 6. One or more jackets 118 may be coupled to cores 114 at the end of the heaters and return current to the neutral of the three-phase wye transformer.

FIG. 8 depicts a side view representation of the end section of three insulated conductors 112 in conduit 156. The end section is the section of the heaters the furthest away from (distal from) the surface of the formation. The end section includes contactor section 162 coupled to conduit 156. In some embodiments, contactor section 162 is welded or brazed to conduit 156. Termination 164 is located in contactor section 162. Termination 164 is electrically coupled to insulated conductors 112 and return conductor 160. Termination 164 electrically couples the cores of insulated conductors 112 to the return conductor 160 at the ends of the heaters.

In certain embodiments, heater 154, depicted in FIGS. 6 and 8, includes an overburden section using copper as the core of the insulated conductors. The copper in the overburden section may be the same diameter as the cores used in the heating section of the heater. The copper in the overburden section may have a larger diameter than the cores in the heating section of the heater. Increasing the size of the copper in the overburden section may decrease losses in the overburden section of the heater.

Heaters that include three insulated conductors 112 in conduit 156, as depicted in FIGS. 6 and 8, may be made in a multiple step process. In some embodiments, the multiple step process is performed at the site of the formation or treatment area. In some embodiments, the multiple step process is performed at a remote manufacturing site away from the formation. The finished heater is then transported to the treatment area.

Insulated conductors 112 may be pre-assembled prior to the bundling either on site or at a remote location. Insulated conductors 112 and return conductor 160 may be positioned on spools. A machine may draw insulated conductors 112 and return conductor 160 from the spools at a selected rate. Preformed blocks of insulation material may be positioned around return conductor 160 and insulated conductors 112. In an embodiment, two blocks are positioned around return conductor 160 and three blocks are positioned around insulated conductors 112 to form electrical insulator 116'. The insulated conductors and return conductor may be drawn or pushed into a plate of conduit material that has been rolled into a tubular shape. The edges of the plate may be pressed together and welded (for example, by laser welding). After forming conduit 156 around electrical insulator 116', the bundle of insulated conductors 112, and return conductor 160, the conduit may be compacted against the electrical insulator 160 so that all of the components of the heater are pressed together into a compact and tightly fitting form. During the compaction, the electrical insulator may flow and fill any gaps inside the heater.

In some embodiments, heater 154 (which includes conduit 156 around electrical insulator 116' and the bundle of insulated conductors 112 and return conductor 160) is inserted into a coiled tubing tubular that is placed in a wellbore in the formation. The coiled tubing tubular may be left in place in the formation (left in during heating of the formation) or removed from the formation after installation of the heater. The coiled tubing tubular may allow for easier installation of heater 154 into the wellbore.

In some embodiments, one or more components of heater 154 are varied (for example, removed, moved, or replaced) while the operation of the heater remains substantially identical. FIG. 9 depicts an embodiment of heater 154 with three insulated cores 114 in conduit 156. In this embodiment, electrical insulator 116' surrounds cores 114 and return conductor 160 in conduit 156. Cores 114 are located in conduit 156 without an electrical insulator and jacket surrounding the cores. Cores 114 are coupled to the single transformer in a three-phase wye configuration with each core 114 coupled to one phase of the transformer. Return conductor 160 is electrically coupled to the ends of cores 114 and returns current from the ends of the cores to the transformer on the surface of the formation.

FIG. 10 depicts an embodiment of heater 154 with three insulated conductors 112 and insulated return conductor in conduit 156. In this embodiment, return conductor 160 is an insulated conductor with core 114, electrical insulator 116, and jacket 118. Return conductor 160 and insulated conductors 112 are located in conduit 156 surrounded by electrical insulator 116'. Return conductor 160 and insulated conductors 112 may be the same size or different sizes. Return conductor 160 and insulated conductors 112 operate substantially the same as in the embodiment depicted in FIGS. 6 and 8.

In some embodiments, three insulated conductor heaters (for example, mineral insulated conductor heaters) are coupled together into a single assembly. The single assembly may be built in long lengths and may operate at high voltages (for example, voltages of 4000 V nominal). In certain embodiments, the individual insulated conductor heaters are enclosed in corrosive resistant jackets to resist damage from the external environment. The jackets may be, for example, seam welded stainless steel armor similar to that used on type MC/CWCMC cable.

In some embodiments, three insulated conductor heaters are cabled and the insulating filler added in conventional methods known in the art. The insulated conductor heaters may include one or more heater sections that resistively heat and provide heat to formation adjacent to the heater sections. The insulated conductors may include one or more other sections that provide electricity to the heater sections with relatively small heat loss. The individual insulated conductor heaters may be wrapped with high temperature fiber tapes before being placed on a take-up reel (for example, a coiled tubing rig). The reel assembly may be moved to another machine for application of an outer metallic sheath or outer protective conduit.

In some embodiments, the fillers include glass, ceramic or other temperature resistant fibers that withstand operating temperature of 760° C. or higher. In addition, the insulated conductor cables may be wrapped in multiple layers of a ceramic fiber woven tape material. By wrapping the tape around the cabled insulated conductor heaters prior to application of the outer metallic sheath, electrical isolation is provided between the insulated conductor heaters and the outer sheath. This electrical isolation inhibits leakage current from the insulated conductor heaters passing into the subsurface formation and forces any leakage currents to return directly to the power source on the individual insulated conductor sheaths and/or on a lead-in conductor or lead-out conductor coupled to the insulated conductors. The lead-in or lead-out conductors may be coupled to the insulated conductors when the insulated conductors are placed into an assembly with the outer metallic sheath.

In certain embodiments, the insulated conductor heaters are wrapped with a metallic tape or other type of tape instead of the high temperature ceramic fiber woven tape material. The metallic tape holds the insulated conductor heaters together. A widely-spaced wide pitch spiral wrapping of a high temperature fiber rope may be wrapped around the insulated conductor heaters. The fiber rope may provide electrical isolation between the insulated conductors and the outer sheath. The fiber rope may be added at any stage during assembly. For example, the fiber rope may be added as a part of the final assembly when the outer sheath is added. Application of the fiber rope may be simpler than other electrical isolation methods because application of the fiber rope is done with only a single layer of rope instead of multiple layers of ceramic tape. The fiber rope may be less expensive than multiple layers of ceramic tape. The fiber rope may increase heat transfer between the insulated conductors and the outer sheath and/or reduce interference with any welding process used to weld the outer sheath around the insulated conductors (for example, seam welding).

Typical temperature measurement methods may be difficult and/or expensive to implement for use in assessing a temperature profile of a heater located in a subsurface formation for heating in an in situ heat treatment process. The desire is for a temperature profile that includes multiple temperatures along the length or a portion of the heater in the subsurface formation. Thermocouples are one possible solution; however, thermocouples provide only one temperature at one location and two wires are generally needed for each thermocouple. Thus, to obtain a temperature profile along a length of the heater, multiple pairs of wires are needed. The risk of failure of one or more of the thermocouples (or their associated wires) is increased with the use of multiple wires in the subsurface wellbore. In addition, thermocouples installed in high temperature applications (>300° C.) may suffer from a phenomenon known as temperature measurement drift. Temperature measurement drift may be a significant source of error.

Another possible solution is the use of a fiber optic cable temperature sensor system. The fiber optic cable system provides a temperature profile along a length of the heater. Commercially available fiber optic cable systems, however, typically only have operating temperature ranges up to about 300° C. and are susceptible to mechanical damage because of the softening of the fiber and, or fiber coatings resulting in the various materials adhering to each other. Thus, these systems are not suitable for measurement of higher temperatures encountered while heating the subsurface formation during the in situ heat treatment process. Some experimental fiber optic cable systems are suitable for use at these higher temperatures but these systems may be too expensive for implementation in a commercial process (for example, a large field of heaters). Thus, there is a need for a simple, inexpensive system that allows temperature assessment at one or more locations along a length of the subsurface heater used in the in situ heat treatment process, without the use of an additional set of cables.

Current techniques allow for the measurement of dielectric properties of insulation along a length of the insulation (measurement of dielectric properties distributed along the length of the insulation). These techniques provide a profile of the dielectric properties with a spatial resolution (space between measurements) based on the type of insulation and the abilities of the measurement system. These techniques are currently used to assess dielectric properties and detect insulation flaws and/or insulation damage. Examples of current techniques are axial tomography and line resonance analysis. A version of axial tomography (Mashikian Axial Tomography) is provided by Instrument Manufacturing Company (IMCORP) (Storrs, Conn., U.S.A.). Mashikian Axial Tomography is disclosed in U.S. Pat. Application Pub. No. 2008-0048668 to Mashikian. A version of line resonance analysis (LIRA) is provided by Wirescan AS (Halden, Norway). Wirescan AS LIRA is disclosed in International Pat. Pub. No. WO 2007/040406 to Fantoni.

Figure 11:
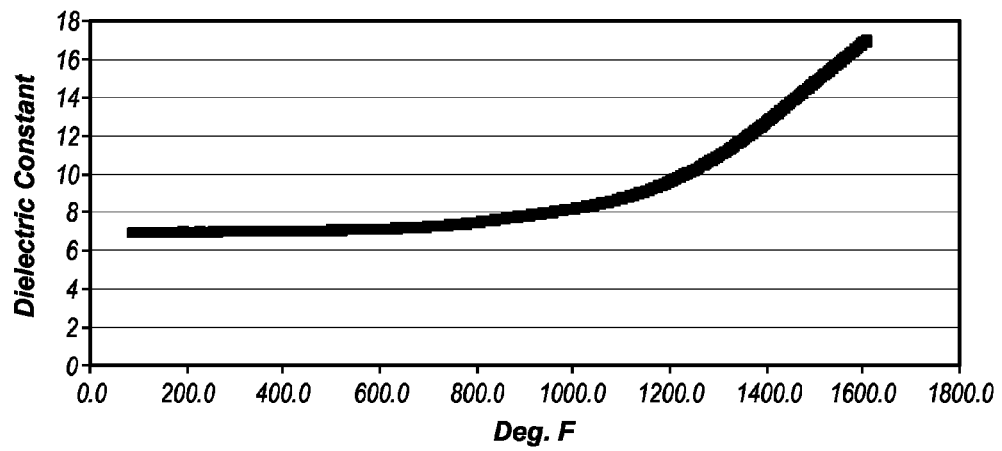
FIG. 11 depicts an example of a plot of dielectric constant versus temperature for magnesium oxide insulation in one embodiment of an insulated conductor heater.
Figure 12:
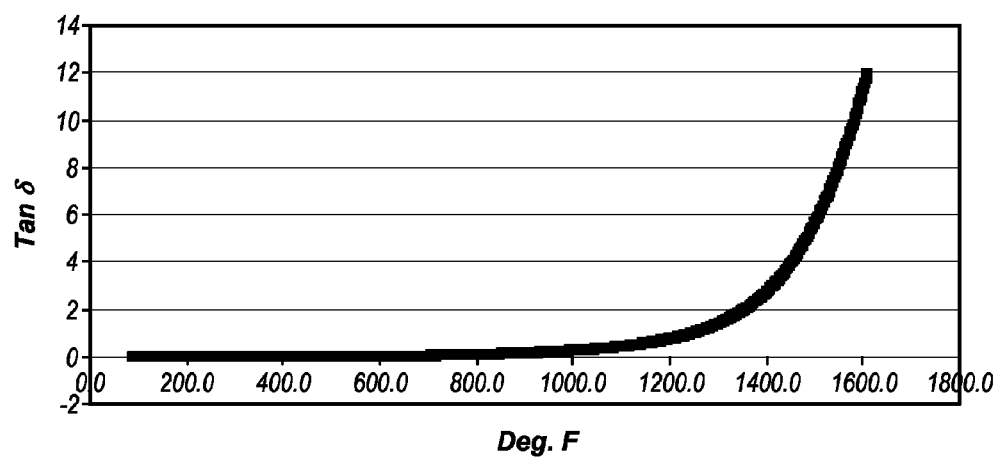
FIG. 12 depicts an example of a plot of loss tangent (tan δ) versus temperature for magnesium oxide insulation in one embodiment of an insulated conductor heater.

The assessment of dielectric properties (using either the current techniques or modified versions of these techniques) may be used in combination with information about the temperature dependence of dielectric properties to assess a temperature profile of one or more energized heaters (heaters that are powered and providing heat). The temperature dependence data of the dielectric properties may be found from simulation and/or experimentation. Examples of dielectric properties of the insulation that may be assessed over time include, but are not limited to, dielectric constant and loss tangent. FIG. 11 depicts an example of a plot of dielectric constant versus temperature for magnesium oxide insulation in one embodiment of an insulated conductor heater. FIG. 12 depicts an example of a plot of loss tangent (tan δ), measured at 60 Hz., versus temperature for magnesium oxide insulation in one embodiment of an insulated conductor heater.

It should be noted that the temperature dependent behavior of a dielectric property may vary based on certain factors. Factors that may affect the temperature dependent behavior of the dielectric property include, but are not limited to, the type of insulation, the dimensions of the insulation, the time the insulation is exposed to environment (for example, heat from the heater), the composition (chemistry) of the insulation, moisture content, and the compaction of the insulation. Thus, it is typically necessary to measure (either by simulation and/or experimentation) the temperature dependent behavior of the dielectric property for the embodiment of insulation that is to be used in a selected heater.

In certain embodiments, one or more dielectric properties of the insulation in a heater having electrical insulation are assessed (measured) and compared to temperature dependence data of the dielectric properties to assess (determine) a temperature profile along a length of the heater (for example, the entire length of the heater or a portion of the heater). For example, the temperature of an insulated conductor heater (such as a mineral insulated (MI) cable heater) may be assessed based on dielectric properties of the insulation used in the heater. Examples of insulated conductor heaters are depicted in FIGS. 5A, 5B, and 6. Since the temperature dependence of the dielectric property measured is known or estimated from simulation and/or experimentation, the measured dielectric property at a location along the heater may be used to assess the temperature of the heater at that location. Using techniques that measure the dielectric properties at multiple locations along a length of the heater (as is possible with current techniques), a temperature profile along that heater length may be provided.

In some embodiments, as shown by the plots in FIGS. 11 and 12 the dielectric properties are more sensitive to temperature at higher temperatures (for example, above about 900° F., as shown in FIGS. 11 and 12). Thus, in some embodiments, the temperature of a portion of the insulated conductor heater is assessed by measurement of the dielectric properties at temperatures above about 400° C. (about 760° F.). For example, the temperature of the portion may be assessed by measurement of the dielectric properties at temperatures ranging from about 400° C., about 450° C., or about 500° C. to about 800° C., about 850° C., or about 900° C. These ranges of temperatures are above temperatures that can be measured using commercially available fiber optic cable systems. A fiber optic cable system suitable for use in the higher temperature ranges may, however, provide measurements with higher spatial resolution than temperature assessment by measurement of the dielectric properties. Thus, in some embodiments, the fiber optic cable system operable in the higher temperature ranges may be used to calibrate temperature assessment by measurement of dielectric properties.

At temperatures below these temperature ranges (for example, below about 400° C.), temperature assessment by measurement of the dielectric properties may be less accurate. Temperature assessment by measurement of the dielectric properties may, however, provide a reasonable estimate or "average" temperature of portions of the heater. The average temperature assessment may be used to assess whether the heater is operating at temperatures below about 500° C., below about 450° C., or below about 400° C.

Temperature assessment by measurement of dielectric properties may provide a temperature profile along a length or portion of the insulated conductor heater (temperature measurements distributed along the length or portion of the heater). Measuring the temperature profile is more useful for monitoring and controlling the heater as compared to taking temperature measurements at only selected locations (such as temperature measurement with thermocouples). Multiple thermocouples may be used to provide a temperature profile. Multiple wires (one for each thermocouple), however, would be needed. Temperature assessment by measurement of dielectric properties uses only one wire for measurement of the temperature profile, which is simpler and less expensive than using multiple thermocouples. In some embodiments, one or more thermocouples placed at selected locations are used to calibrate temperature assessment by measurement of dielectric properties.

In certain embodiments, the dielectric properties of the insulation in an insulated conductor heater are assessed (measured) over a period of time to assess the temperature and operating characteristics of the heater over the period of time. For example, the dielectric properties may be assessed continuously (or substantially continuously) to provide real-time monitoring of the dielectric properties and the temperature. Monitoring of the dielectric properties and the temperature may be used to assess the condition of the heater during operation of the heater. For example, comparison of the assessed properties at specific locations versus the average properties over the length of the heater may provide information on the location of hot spots or defects in the heater.

In some embodiments, the dielectric properties of the insulation change over time. For example, the dielectric properties may change over time because of changes in the oxygen concentration in the insulation over time and/or changes in the water content in the insulation over time. Oxygen in the insulation may be consumed by chromium or other metals used in the insulated conductor heater. Thus, the oxygen concentration decreases with time in the insulation and affects the dielectric properties of the insulation.

The changes in dielectric properties over time may be measured and compensated for through experimental and/or simulated data. For example, the insulated conductor heater to be used for temperature assessment may be heated in an oven or other apparatus and the changes in dielectric properties can be measured over time at various temperatures and/or at constant temperatures. In addition, thermocouples may be used to calibrate the assessment of dielectric properties changes over time by comparison of thermocouple data to temperature assessed by the dielectric properties.

In certain embodiments, temperature assessment by measurement of dielectric properties is performed using a computational system such as a workstation or computer. The computational system may receive measurements (assessments) of the dielectric properties along the heater and correlate these measured dielectric properties to assess temperatures at one or more locations on the heater. For example, the computational system may store data about the relationship of the dielectric properties to temperature (such as the data depicted in FIGS. 11 and 12) and/or time, and use this stored data to calculate the temperatures on the heater based on the measured dielectric properties.

In certain embodiments, temperature assessment by dielectric properties measurement is performed on an energized heater providing heat to the subsurface formation (for example, at least a portion of an insulated conductor heater provided with electric power to resistively heat and providing at least some heat to the subsurface formation from the portion of the insulated conductor). Assessing temperature on the energized heater allows for detection of defects in the insulation on the device actually providing heat to the formation. Assessing temperature on the energized heater, however, may be more difficult due to attenuation of signal along the heater because the heater is resistively heating. This attenuation may inhibit seeing further along the length of the heater (deeper into the formation along the heater). In some embodiments, temperatures in the upper sections of heaters (sections of the heater closer to the overburden, for example, the upper half or upper third of the heater) may be more important for assessment because these sections have higher voltages applied to the heater, are at higher temperatures, and are at higher risk for failure or generation of hot spots. The signal attenuation in the temperature assessment by dielectric properties measurement may not be as significant a factor in these upper sections because of the proximity of these sections to the surface.

In some embodiments, power to the insulated conductor heater is turned off before performing the temperature assessment. Power is then returned to the insulated conductor heater after the temperature assessment. Thus, the insulated conductor heater is subjected to a heating on/off cycle to assess temperature. This on/off cycle may, however, reduce the lifetime of the heater due to the thermal cycling. In addition, the heater may cool off during the non-energized time period and provide less accurate temperature information (less accurate information on the actual working temperature of the heater).

In certain embodiments, temperature assessment by dielectric properties measurement is performed on an insulated conductor that is not to be used for heating or not configured for heating. Such an insulated conductor may be a separate insulated conductor temperature probe. In some embodiments, the insulated conductor temperature probe is a non-energized heater (for example, an insulated conductor heater not powered). The insulated conductor temperature probe may be a stand-alone device that can be located in an opening in the subsurface formation to measure temperature in the opening. In some embodiments, the insulated conductor temperature probe is a looped probe that goes out and back into the opening with signals transmitted in one direction on the probe. In some embodiments, the insulated conductor temperature probe is a single hanging probe with the signal transmitted along the core and returned along the sheath of the insulated conductor.

In certain embodiments, the insulated conductor temperature probe includes a copper core (to provide better conductance to the end of the cable and better spatial resolution) surrounded by magnesium oxide insulation and an outer metal sheath. The outer metal sheath may be made of any material suitable for use in the subsurface opening. For example, the outer metal sheath may be a stainless steel sheath or an inner sheath of copper wrapped with an outer sheath of stainless steel. Typically, the insulated conductor temperature probe operates up to temperatures and pressures that can be withstood by the outer metal sheath.

In some embodiments, the insulated conductor temperature probe is located adjacent to or near an energized heater in the opening to measure temperatures along the energized heater. There may be a temperature difference between the insulated conductor temperature probe and the energized heater (for example, between about 50° C. and 100° C. temperature differences). This temperature difference may be assessed through experimentation and/or simulation and accounted for in the temperature measurements. The temperature difference may also be calibrated using one or more thermocouples attached to the energized heater.

In some embodiments, one or more thermocouples are attached to the insulated conductor used for temperature assessment (either an energized insulated conductor heater or a non-energized insulated conductor temperature probe). The attached thermocouples may be used for calibration and/or backup measurement of the temperature assessed on the insulated conductor by dielectric property measurement. In some embodiments, calibration and/or backup temperature indication is achieved by assessment of the resistance variation of the core of the insulated conductor at a given applied voltage. Temperature may be assessed by knowing the resistance versus temperature profile of the core material at the given voltage. In some embodiments, the insulated conductor is a loop and current induced in the loop from energized heaters in the subsurface opening provides input for the resistance measurement.

In certain embodiments, insulation material properties in the insulated conductor are varied to provide different sensitivities to temperature for the insulated conductor. Examples of insulation material properties that may be varied include, but are not limited to, the chemical and phase composition, the microstructure, and/or the mixture of insulating materials. Varying the insulation material properties in the insulated conductor allows the insulated conductor to be tuned to a selected temperature range. The selected temperature range may be selected, for example, for a desired application of the insulated conductor.

In some embodiments, insulation material properties are varied along the length of the insulated conductor (the insulation material properties are different at selected points within the insulated conductor). Varying properties of the insulation material at known locations along the length of the insulated conductor allows the measurement of the dielectric properties to give location information and/or provide for self-calibration of the insulated conductor in addition to providing temperature assessment. In some embodiments, the insulated conductor includes a portion with insulation material properties that allow the portion to act as a reflector. The reflector portion may be used to limit temperature assessment to specific portions of the insulated conductor (for example, a specific length of insulated conductor). One or more reflector portions may be used to provide spatial markers along the length of the insulated conductor.

Varying the insulation material properties adjusts the activation energy of the insulation material. Typically, increasing the activation energy of the insulation material reduces attenuation in the insulation material and provides better spatial resolution. Lowering the activation energy typically provides better temperature sensitivity. The activation energy may be raised or lowered, for example, by adding different components to the insulation material. For example, adding certain components to magnesium oxide insulation will lower the activation energy. Examples of components that may be added to magnesium oxide to lower the activation energy include, but are not limited to, titanium oxide, nickel oxide, and iron oxide.

In some embodiments, temperature is assessed using two or more insulated conductors. The insulation material in the insulated conductors may have different activation energies to provide a variation in spatial resolution and temperature sensitivity to more accurately assess temperature in the subsurface opening. The higher activation energy insulated conductor may be used to provide better spatial resolution and identify the location of hot spots or other temperature variations more accurately while the lower activation energy insulated conductor may be used to provide more accurate temperature measurement at those locations.

In some embodiments, temperature is assessed by assessing leakage current from the insulated conductor. Temperature dependence data of the leakage current may be used to assess the temperature based on assessed (measured) leakage current from the insulated conductor. The measured leakage current may be used in combination with information about the temperature dependence of the leakage current to assess a temperature profile of one or more heaters or insulated conductors located in a subsurface opening. The temperature dependence data of the leakage current may be found from simulation and/or experimentation. In certain embodiments, the temperature dependence data of the leakage current is also dependent on the voltage applied to the heater.

Figure 13:
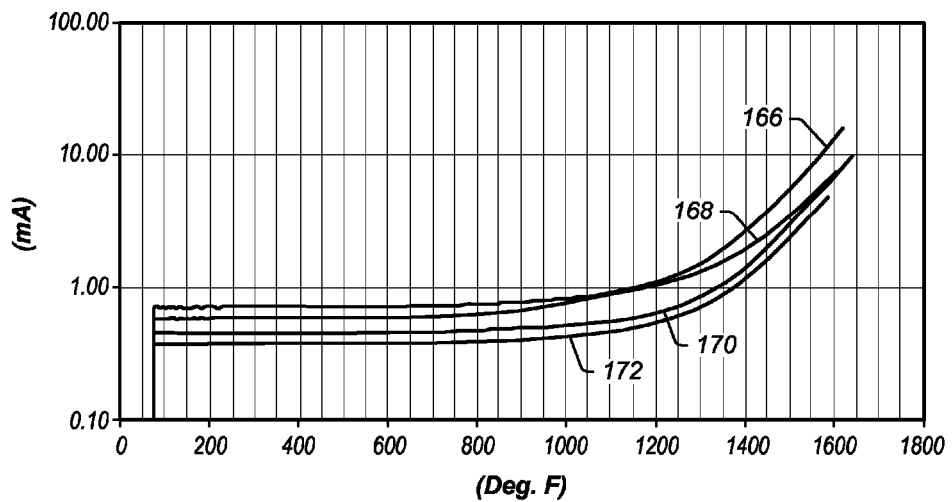
FIG. 13 depicts an example of a plot of leakage current (mA) versus temperature (° F.) for magnesium oxide insulation in one embodiment of an insulated conductor heater at different applied voltages.

FIG. 13 depicts an example of a plot of leakage current (mA) versus temperature (° F.) for magnesium oxide insulation in one embodiment of an insulated conductor heater at different applied 60 Hz voltages. Plot 166 is for an applied voltage of 4300 V. Plot 168 is for an applied voltage of 3600 V. Plot 170 is for an applied voltage of 2800 V. Plot 172 is for an applied voltage of 2100 V.

As shown by the plots in FIG. 13, the leakage current is more sensitive to temperature at higher temperatures (for example, above about 482° C. (about 900° F.). Thus, in some embodiments, the temperature of a portion of the insulated conductor heater is assessed by measurement of the leakage current at temperatures above about 500° C. (about 932° F.) or in a range from about 500° C. to about 870° C., about 510° C. to about 810° C. or from 540° C. to about 650° C.

A temperature profile along a length of the heater may be obtained by measuring the leakage current along the length of the heater using techniques known in the art. In some embodiments, assessment of temperature by measuring the leakage current is used in combination with temperature assessment by dielectric properties measurement. For example, temperature assessment by measurement of the leakage current may be used to calibrate and/or backup temperature assessments made by measurement of dielectric properties.

Figure 14:
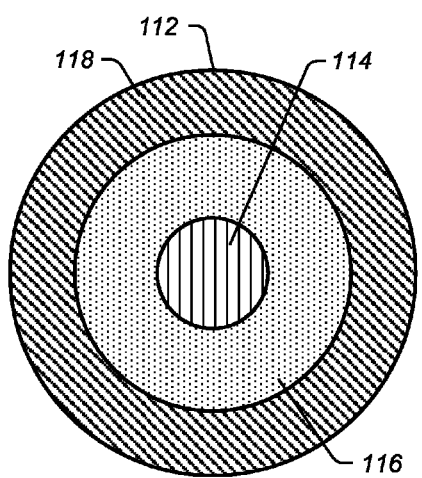
FIG. 14 depicts an embodiment of an insulated conductor with salt used as electrical insulator.

In certain embodiments, an insulated conductor using salt as the electrical insulator is used for temperature measurement. The salt becomes an electrical conductor above the melting temperature ($T_m$) of the salt and allows current to flow through the electrical insulator. FIG. 14 depicts an embodiment of insulated conductor 112 with salt used as electrical insulator 116. Core 114 is copper or another suitable electrical conductor. Jacket 118 is stainless steel or another suitable corrosion-resistant electrical conductor. In one embodiment, core 114 is 0.125" (about 0.3175 cm) diameter copper surrounded by electrical insulator 116. Electrical insulator 116 is 0.1" (about 0.25 cm) thick salt insulation surrounded by jacket 118. Jacket 118 is 0.1" (about 0.25 cm) thick stainless steel. The outer diameter of insulated conductor 112 is then 0.525" (about 1.33 cm).

In certain embodiments, electrical insulator 116 includes a salt with a melting temperature ($T_m$) at a desired temperature. The desired temperature may be a temperature in the range of operation of a subsurface heater or a maximum temperature desired in the opening. For example, the desired temperature may be above about 300° C. or in a range between 300° C., 400° C., about 450° C., or about 500° C. and about 800° C., about 850° C., or about 900° C. Examples of salts include, but are not limited to, $Na_2CO_3$ ($T_m$=851° C.), $Li_2CO_3$ ($T_m$=732° C.), LiCl ($T_m$=605° C.), KOH ($T_m$=420° C.), $KNO_3$ ($T_m$=334° C.), $NaNO_3$ ($T_m$=308° C.), and mixtures thereof. In some embodiments, magnesium oxide (such as porous magnesium oxide) is added to the salt to provide mechanical centering support. The magnesium oxide maintains the integrity and structure of insulated conductor 112 when the salt melts. Porous magnesium oxide allows for electrical connectivity between core 114 and jacket 118 by having the salt distributed in the pores of the magnesium oxide.

In certain embodiments, a mixture of two or more salts is used in electrical insulator 116 of insulated conductor 112. Varying the composition of the salts in the mixture allows for adjusting and tuning the melting temperature of the mixture to a desired temperature. In some embodiments, the composition of eutectic mixtures of salts is adjusted and tuned to the desired temperature. Eutectic mixtures may allow for finer adjustment and tuning to the desired temperature. Examples of eutectic mixtures that may be used include, but are not limited to, $K_2CO_3$:$Na_2CO_3$:$Li_2CO_3$ and $KNO_3$:$NaNO_3$.

Insulated conductor 112 may be coupled to or located near one or more heaters in a subsurface wellbore to assess the temperature at one or more locations along the length of the insulated conductor at or near the heaters. In some embodiments, insulated conductor 112 is similar in length to the heaters in the subsurface wellbore. In some embodiments, insulated conductor 112 has a shorter length than the heaters. In some embodiments, more than one insulated conductor 112 may be used in the wellbore to assess the temperature at different locations in the wellbore and/or at different temperatures.

Figure 15:
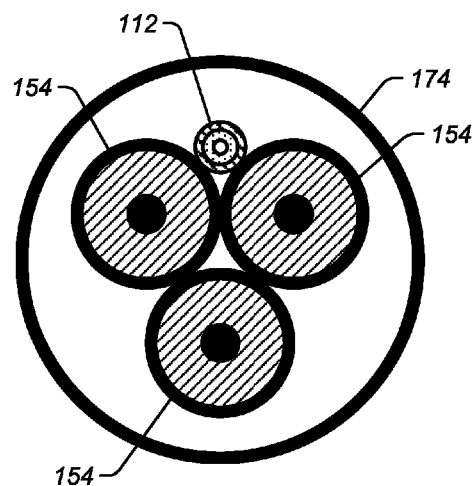
FIG. 15 depicts an embodiment of an insulated conductor located proximate heaters in a wellbore.

FIG. 15 depicts an embodiment of insulated conductor 112 located proximate heaters 154 in wellbore 174. In some embodiments, insulated conductor 112 is coupled to one or more of heaters 154. For example, insulated conductor 112 may be strapped to the assembly of heaters 154. Heaters 154 may be insulated conductor heaters, conductor-in-conduit heaters, other types of heaters described herein, or combinations thereof.

To assess a location that is hotter than other portions of insulated conductor 112, voltage is applied to core 114 and jacket 118 of the insulated conductor, as shown in FIG. 16. Below the melting temperature ($T_m$) of the salt, there is little or no current drawn by core 114 and jacket 118 because the salt is in a solid phase. In the solid phase, the salt acts as an electrical insulator with resistivities above about $10^6$ Ω-cm.

In some embodiments, hot spot 176 may develop at some location along the insulated conductor 112. Hot spot 176 is hotter than other portions along the length of insulated conductor 112. Hot spot 176 may be caused by a hot spot developing on or near one or more heaters located in the wellbore (for example, heaters 154 depicted in FIG. 15). At hot spot 176, the salt melts and becomes a liquid or molten salt. In the liquid phase, the salt becomes an electrical conductor with resistivities below 1 Ω-cm. Thus, current begins to flow between the surface and hot spot 176, as shown by the arrows in FIG. 16. Once current begins to flow through core 114 and jacket 118 of insulated conductor 112, if the resistance of the core and the jacket are known, the distance from the surface to hot spot 176 (x in FIG. 16) may be assessed by the measured current at the surface.

In certain embodiments, multiple hotspots may be located using insulated conductor 112. Time domain reflectometry may be used to locate multiple hotspots along insulated conductor 112 because the insulated conductor has a coaxial geometry. FIG. 17 shows insulated conductor 112 with multiple hot spots 176A, 176B. Incident pulse 178 is provided to insulated conductor 112. Reflected pulses 180A, 180B are generated at corresponding hot spots 176A, 176B.

The conductive molten salt at hot spots 176A, 176B provides a strong impedance mismatch for the reflections. The reflection coefficient for each hotspot can be assessed using EQN. 1:

$$\rho = (Z_{HS} - Z_0)/(Z_{HS} + Z_0); \quad \text{(EQN. 1)}$$

where $Z_{HS}$ is the impedance of the hotspot, and $Z_0$ is the impedance of the insulated conductor (cable).

The location of the hotspots ($X_{HSa}$, $X_{HSb}$) can be assessed by assessing (measuring) the transit time, $\tau$, between the incident and reflected pulses and using EQN. 2:

$$X_{HS} = v^*\tau/2; \quad \text{(EQN. 2)}$$

where $v = v_c/\sqrt{\epsilon}$ is the propagation velocity, $v_c$, is the speed of light, and $\epsilon$ is the dielectric constant of the salt insulation, which depends upon the salt used and compaction of the insulated conductor.

In some embodiments, a hairpin insulated conductor configuration is used. The hairpin configuration allows for testing from both ends of the insulated conductor and increases the accuracy of hotspot location.

In some embodiments, assessment of the locations of hotspots by assessing the current or pulses applied to salt based insulated conductor 112 is used in combination with temperature assessment using thermocouples and/or fiber optic cable temperature sensor. The thermocouples and/or fiber optic cable temperature sensor may be used for calibration and/or backup measurement of the temperature assessment using the salt based insulated conductor.

It is to be understood the invention is not limited to particular systems described which may, of course, vary. It is also to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "a layer" includes a combination of two or more layers and reference to "a fluid" includes mixtures of fluids.

In this patent, certain U.S. patents and U.S. patent applications have been incorporated by reference. The text of such U.S. patents and U.S. patent applications is, however, only incorporated by reference to the extent that no conflict exists between such text and the other statements and drawings set forth herein. In the event of such conflict, then any such conflicting text in such incorporated by reference U.S. patents and U.S. patent applications is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for assessing a temperature in an opening in a subsurface formation, comprising:
   assessing a profile of one or more dielectric properties with spatial resolution along a length of an insulated conductor located in the opening; and
   assessing a temperature profile with spatial resolution along the length of the insulated conductor based on the assessed profile of the one or more dielectric properties.

2. The method of claim 1, further comprising providing electrical power to at least a portion of the insulated conductor, and providing at least some heat to the subsurface formation from the portion of the insulated conductor.

3. The method of claim 1, further comprising providing electrical power to at least one additional insulated conductor located in the opening, and providing at least some heat to the subsurface formation from the additional insulated conductor.

4. The method of claim 1, wherein assessing the temperature profile comprises comparing temperature dependence data of the dielectric properties to the assessed profile of the one or more dielectric properties.

5. The method of claim 1, wherein at least one of the dielectric properties comprises a dielectric constant.

6. The method of claim 1, wherein at least one of the dielectric properties comprises a loss tangent.

7. The method of claim 1, wherein at least a portion of the assessed temperature profile is at temperatures above about 400° C.

8. The method of claim 1, wherein at least a portion of the assessed temperature profile is at temperatures in a range between about 400° C. and about 900° C.

9. The method of claim 1, further comprising assessing the temperature profile using a computational system configured to store temperature dependence data of the dielectric properties.

10. The method of claim 1, wherein the length of the insulated conductor assessed comprises at most an upper half of the insulated conductor.

11. The method of claim 1, wherein the insulated conductor comprises a core, an insulation material surrounding the core, and an outer sheath surrounding the insulation material.

12. A method for assessing a temperature at one or more locations in an opening in a subsurface formation, comprising:
   applying a voltage to an insulated conductor locating in the opening, wherein at least a portion of the insulated conductor comprises a core substantially surrounded by an electrical insulator and a jacket, respectively, and the electrical insulator comprises a salt configured to melt at a desired temperature; and
   assessing at least one location along the length of the insulated conductor where the salt has melted by assessing the current flowing through the core and the jacket of the insulated conductor.

13. The method of claim 12, further comprising providing heat from one or more heaters located in the opening, wherein at least one of the locations assessed along the length of the insulated conductor comprises a hotspot generated by at least one of the heaters.

14. The method of claim 12, wherein the locations at which the salt has melted are hotter than other portions of the opening.

15. The method of claim 12, further comprising providing at least one incident pulse to the insulated conductor, and assessing one or more reflected pulses to assess one or more locations along the length of the insulated conductor at which the salt has melted.

16. The method of claim 12, wherein the desired temperature is above about 300° C.

17. The method of claim 12, wherein the desired temperature is in a range between about 300° C. and about 900° C.

18. The method of claim 12, wherein at least two of the locations at which the salt has melted are distributed at different locations along the length of the insulated conductor.

19. The method of claim 12, wherein the salt comprises a mixture of salts.

20. The method of claim 12, wherein the electrical insulator comprises porous magnesium oxide with salt located in the pores of the magnesium oxide.

21. A method for assessing a temperature at one or more locations in an opening in a subsurface formation, comprising:
   providing a voltage with at least one incident pulse to an insulated conductor locating in the opening, wherein at least a portion of the insulated conductor comprises a core substantially surrounded by an electrical insulator and a jacket, respectively, and the electrical insulator comprises a salt configured to melt in a desired temperature range; and
   assessing at least one location along the length of the insulated conductor at which the salt has melted by assessing at least one property of at least one pulse reflected from at least one of the locations at which the salt has melted.

22. The method of claim 21, further comprising providing heat from one or more heaters located in the opening, wherein at least one of the locations assessed along the length of the insulated conductor comprises a hotspot generated by at least one of the heaters.

23. The method of claim 21, wherein the locations at which the salt has melted are hotter than other portions of the opening.

24. The method of claim 21, further comprising assessing at least one of the locations at which the salt has melted using time domain reflectometry.

25. The method of claim 21, further comprising assessing at least one of the locations at which the salt has melted by assessing a transit time between the incident and reflected pulses.

26. The method of claim 21, wherein the desired temperature is above about 300° C.

27. The method of claim 21, wherein the desired temperature is in a range between about 300° C. and about 900° C.

28. The method of claim 21, wherein at least two of the locations at which the salt has melted are distributed at different locations along the length of the insulated conductor.

29. The method of claim 21, wherein the salt comprises a mixture of salts.

30. The method of claim 21, wherein the electrical insulator comprises porous magnesium oxide with salt located in the pores of the magnesium oxide.

31. The method of claim 1, further comprising providing electrical power to at least a portion of the insulated conductor, and providing heat to the subsurface formation from the portion of the insulated conductor to mobilize at least some hydrocarbons in the subsurface formation.

32. The method of claim 1, further comprising providing electrical power to at least a portion of the insulated conductor such that the insulated conductor heats to a temperature of at least about 400° C.

33. The method of claim 1, wherein the insulated conductor comprises insulation material that is stable at temperatures above at least about 400° C.

34. The method of claim 1, wherein the assessed temperature profile comprises a plurality of temperatures along the length of the insulated conductor.

* * * * *